US009977671B2

(12) United States Patent
Dayan et al.

(10) Patent No.: US 9,977,671 B2
(45) Date of Patent: May 22, 2018

(54) METHODS FOR MULTI-SOURCE CONFIGURATION OF MOBILE APPLICATIONS

(71) Applicant: Google LLC, Mountain View, CA (US)

(72) Inventors: Tal Dayan, Los Gatos, CA (US); Safa Alai, Mountain View, CA (US); Arda Atali, Burlingame, CA (US); Shuai Jiang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 15/207,100

(22) Filed: Jul. 11, 2016

(65) Prior Publication Data
US 2017/0024203 A1 Jan. 26, 2017

Related U.S. Application Data

(60) Provisional application No. 62/194,674, filed on Jul. 20, 2015.

(51) Int. Cl.
G06F 9/44 (2018.01)
G06F 9/445 (2018.01)

(52) U.S. Cl.
CPC ............ *G06F 8/71* (2013.01); *G06F 9/44505* (2013.01)

(58) Field of Classification Search
CPC .............................. G06F 8/70; G06F 9/44505
USPC .................................................. 717/121, 120
See application file for complete search history.

(56) References Cited

U.S. PATENT DOCUMENTS

| 5,247,683 | A | 9/1993 | Holmes et al. |
| 6,205,476 | B1* | 3/2001 | Hayes, Jr. ............... G06F 9/445 709/208 |
| 6,907,420 | B2 | 6/2005 | Gensel |
| 7,499,933 | B1 | 3/2009 | Simpson |
| 8,417,926 | B2 | 4/2013 | Dehaan |
| 8,750,873 | B2* | 6/2014 | Kukuchka ............... H04W 8/18 455/418 |
| 9,047,105 | B2 | 6/2015 | Kinder et al. |
| 9,569,205 | B1* | 2/2017 | McCorkendale ......... G06F 8/71 |
| 2003/0009753 | A1 | 1/2003 | Brodersen et al. |

(Continued)

OTHER PUBLICATIONS

Schilit et al., "Customizing Mobile Applications", 1993.*

(Continued)

*Primary Examiner* — Phillip H Nguyen
(74) *Attorney, Agent, or Firm* — McDonnell Boehnen Hulbert & Berghoff LLP

(57) ABSTRACT

Disclosed are apparatus and methods for processing configuration data sets. A computing device can retrieve configuration data set(s) from data storage. A configuration data set can include key-value pairs related to configuring a software application, where a key-value pair can include a key name and an associated value. The computing device can merge the configuration data set(s) into a merged configuration data set by at least: determining whether multiple key-value pairs of the configuration data set(s) are in conflict; after determining that multiple key-value pairs of the configuration data set(s) are in conflict, determining a representative key-value pair to represent the multiple key-value pairs; and adding the representative key-value pair to the merged configuration data set. The computing device can provide the merged configuration data set to the software application.

24 Claims, 13 Drawing Sheets

(56) References Cited

U.S. PATENT DOCUMENTS

| | | | | |
|---|---|---|---|---|
| 2005/0044165 | A1* | 2/2005 | O'Farrell | G06Q 10/10 709/213 |
| 2006/0156294 | A1* | 7/2006 | Fuller, III | G06F 8/34 717/154 |
| 2008/0040490 | A1* | 2/2008 | Karlberg | G06F 8/61 709/228 |
| 2010/0180221 | A1* | 7/2010 | Cloward | G06F 3/0481 715/764 |
| 2011/0111738 | A1 | 5/2011 | Jones et al. | |
| 2011/0195700 | A1* | 8/2011 | Kukuchka | H04W 8/18 455/422.1 |
| 2012/0303917 | A1 | 11/2012 | Chiu et al. | |
| 2012/0310882 | A1* | 12/2012 | Werner | H04L 67/1095 707/624 |
| 2013/0104118 | A1 | 4/2013 | Somani et al. | |
| 2013/0283400 | A1* | 10/2013 | Schneider | G06F 21/572 726/30 |
| 2013/0298109 | A1 | 11/2013 | Trinchini et al. | |
| 2014/0095929 | A1 | 4/2014 | Chan et al. | |
| 2014/0230031 | A1* | 8/2014 | Schneider | H04L 63/08 726/6 |
| 2016/0132314 | A1 | 5/2016 | Solsona-Palomar et al. | |

OTHER PUBLICATIONS

Google Inc., "Merge Manifest Multiple Files", Jun. 18, 2016, available via the Internet at web.archive.org/web/20160618042247/https://developer.android.com/studio/build/manifest-merge.html (last visited Jan. 9, 2017).

International Searching Authority, International Search Report and Written Opinion of the International Search Authority for PCT Pat. App. No. PCT/US2016/041939, dated Oct. 10, 2016.

Splunk, Inc."Splunk Enterprise Admin Manual 6.2.2", Dec. 28, 2016, avialable via the Internet at docs.splunk.com/index.php?title=Documentation:Splunk:Admin: Whatsinthismanual:6.2&action=pdfbook&version=6.2.2 (last visited Jan. 9, 2017).

Anonymous,"Garry's Mod server.cfg generator",Sep. 24, 2013, available via the Internet at web.archive.org/web/20130924053407/http://gmod-servercfg.appspot.com/ (last visited Jul. 19, 2016).

Anonymous,"oslo-config-generator",Jul. 6, 2015, available via the Internet at docs.openstack.org/developer/oslo.config/generator.html (last visited Jul. 6, 2015).

Dysondan., "ConfigGen—.Net Configuration File Generator—Project Description", Sep. 25, 2014, available via the Internet at configgen.codeplex.com (last visited Jul. 6, 2015).

Dysondan., "ConfigGen—.Net Configuration File Generator—Basic Template File Format", Jul. 27, 2012, available via the Internet at configgen.codeplex.com/wikipage?title=Template%20File%20Format&referringTitle=Documentation (last visited Jul. 6, 2015).

K. Lavrsen et al., "Apache Config Generator", Apr. 22, 2015, available via the Internet at foswiki.org/Support.ApacheConfigGnerator (last visited Jul. 6, 2015).

Solarwinds Worldwide, LLC, "Network Config Generator", Apr. 2, 2015, available via the Internet at web.archive.org/web/20150402160515/http://www.solarwinds.com/products/freetools/network-config-generator/ (last visited Jul. 19, 2016).

* cited by examiner

METHODS FOR MULTI-SOURCE CONFIGURATION OF MOBILE APPLICATIONS

CROSS-REFERENCE TO RELATED APPLICATIONS

This application claims priority to U.S. Patent App. No. 62/194,674, entitled "Methods for Multi-Source Configuration of Mobile Applications", filed Jul. 20, 2015, the contents of which are fully incorporated by reference herein for all purposes.

BACKGROUND

Unless otherwise indicated herein, the materials described in this section are not prior art to the claims in this application and are not admitted to be prior art by inclusion in this section.

Configuring mobile applications using remote configuration data is a common way to control the behavior of the application. The remote configuration data can be stored in a single configuration data file, which is often a hand-edited file. The configuration data file and (binary) code for the software application can then be provided to a server for distributing the software application. At the time of application installation, the server delivers the configuration data file and (binary) code for the software application to a requesting device. The requesting device can then install and use the application. During execution, the application can use the data in the configuration data file to control aspects of application behavior.

SUMMARY

In one aspect, a method is provided. A computing device retrieves one or more configuration data sets from a stored plurality of configuration data sets, where a configuration data set of the one or more configuration data sets includes a plurality of key-value pairs related to configuring a software application. A key-value pair of the plurality of key-value pairs includes a key name and a value associated with the key name. The computing device merges the one or more configuration data sets into a merged configuration data set for the software application by at least: determining whether multiple key-value pairs of the one or more configuration data sets are in conflict, after determining that multiple key-value pairs of the one or more configuration data sets are in conflict, determining a representative key-value pair to represent the multiple key-value pairs, and adding the representative key-value pair to the merged configuration data set. The computing device provides the merged configuration data set to the software application.

In another aspect, a computing device is provided. The computing device includes one or more processors and a data storage device. The data storage device at least has instructions stored thereon that, upon execution of the instructions by the one or more processors, cause the one or more processors to perform functions. The functions include: retrieving one or more configuration data sets from a plurality of configuration data sets stored in the data storage device, where a configuration data set of the one or more configuration data sets includes a plurality of key-value pairs related to configuring a software application, and where a key-value pair of the plurality of key-value pairs includes a key name and a value associated with the key name; merging the one or more configuration data sets into a merged configuration data set for the software application by at least: determining whether multiple key-value pairs of the one or more configuration data sets are in conflict, after determining that multiple key-value pairs of the one or more configuration data sets are in conflict, determining a representative key-value pair to represent the multiple key-value pairs, and adding the representative key-value pair to the merged configuration data set; and providing the merged configuration data set to the software application.

In yet another aspect, an article of manufacture is provided. The article of manufacture includes a data storage device having instructions stored thereon that, when executed by one or more processors, cause the one or more processors to perform functions. The functions include: retrieving one or more configuration data sets from a stored plurality of configuration data sets, where a configuration data set of the one or more configuration data sets includes a plurality of key-value pairs related to configuring a software application, and where a key-value pair of the plurality of key-value pairs includes a key name and a value associated with the key name; merging the one or more configuration data sets into a merged configuration data set for the software application by at least: determining whether multiple key-value pairs of the one or more configuration data sets are in conflict, after determining that multiple key-value pairs of the one or more configuration data sets are in conflict, determining a representative key-value pair to represent the multiple key-value pairs, and adding the representative key-value pair to the merged configuration data set; and providing the merged configuration data set to the software application.

In even another aspect, a device is provided. The device includes: means for retrieving one or more configuration data sets from a stored plurality of configuration data sets, where a configuration data set of the one or more configuration data sets includes a plurality of key-value pairs related to configuring a software application, and where a key-value pair of the plurality of key-value pairs includes a key name and a value associated with the key name; means for merging the one or more configuration data sets into a merged configuration data set for the software application that include: means for determining whether multiple key-value pairs of the one or more configuration data sets are in conflict, means for, after determining that multiple key-value pairs of the one or more configuration data sets are in conflict, determining a representative key-value pair to represent the multiple key-value pairs, and means for adding the representative key-value pair to the merged configuration data set; and means for providing the merged configuration data set to the software application.

DETAILED DESCRIPTION

Figure 1:
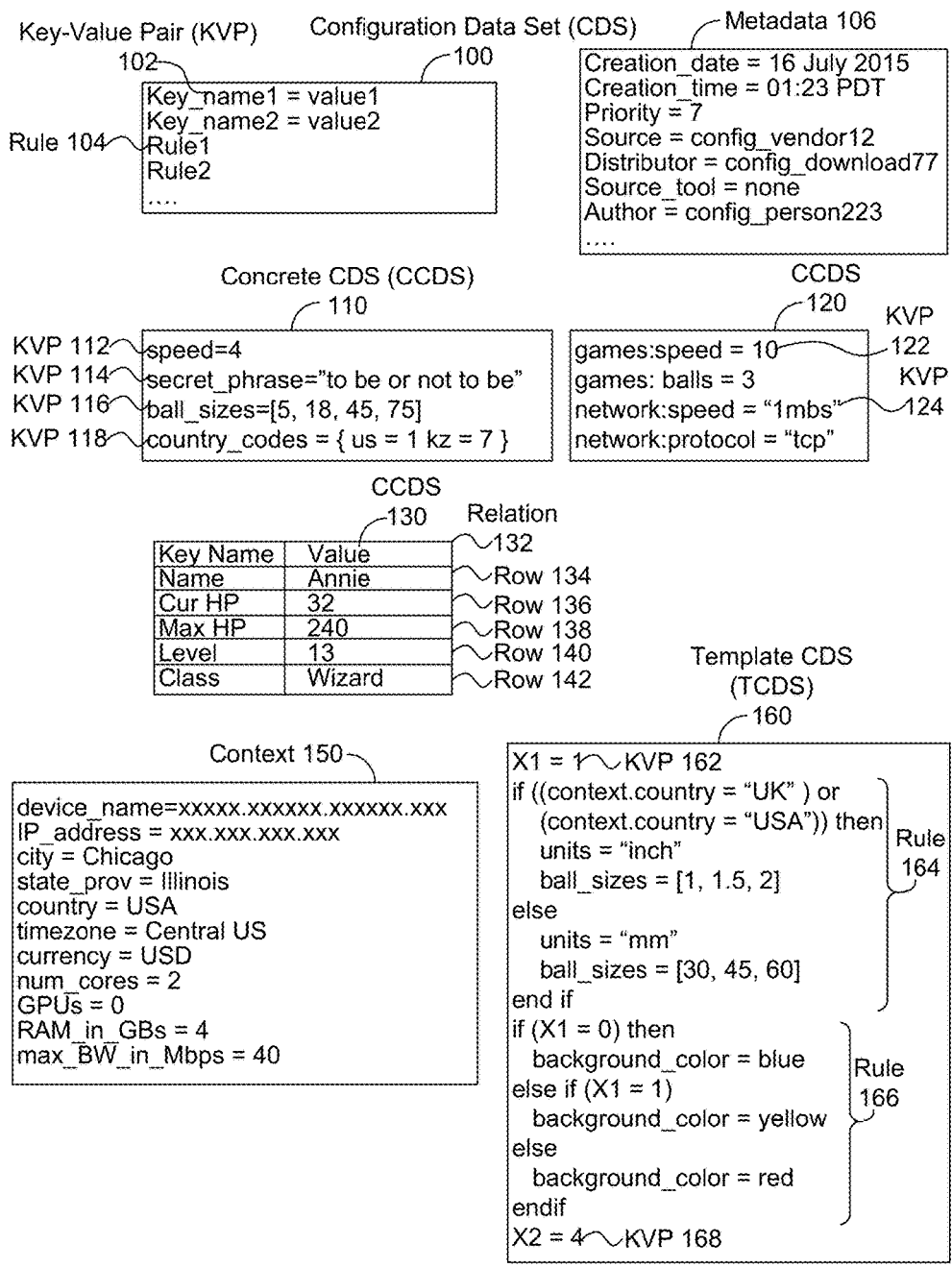
FIG. 1 shows example configuration data sets and a context for the configuration data sets, in accordance with an example embodiment.

One or more configuration systems described herein can accept configuration data sets from multiple sources to increase flexibility of application installation and execution. For example, a game application can have components directed for game play provided by a game-play system, and components directed for network communication provided by a networking system. As such, the game application can have multiple configuration data sets from the game-play system and the networking system, as well as an application-specific configuration data set (and perhaps others). However, application software complexity can increase when multiple configuration data sets are required to execute the application. A configuration system can be or include a computing device. As used herein, a computing device is any machine performing calculations automatically, such as computing device 700 described below in the context of FIG. 7A. Also, as used herein, a configuration data set can include data and perhaps rules that specify information related to various aspects of an application; for example, a configuration data set can be used to configure, install, utilize, and/or execute one or more software applications.

To support multi-source configuration data, the configuration system can receive configuration data sets from multiple sources such as basic configuration editors, domain specific configuration systems (e.g. games), experimentation systems, closed loop optimization systems, application development tools, personalization systems, location specific services and more. The configuration system can support both cloud (network) and on-device (local) configuration data sets.

After receiving configuration data sets, the configuration system can store multiple configuration data sets for an application and deliver the configuration data sets for the application efficiently as a single bundle as requested. Additionally, the configuration system can resolve conflicts between configuration data sets from different sources as necessary, and merge the configuration data sets into a single, consistent, actionable configuration data set for use by an application.

To perform these tasks, the configuration system can execute software that includes use three functions: a bundle function or "bundler", a resolve function or "resolver", and a merge function or "merger". The bundle function can take configuration data sets from multiple sources, maintain and store the configuration data sets on a per-source basis, and package the configuration data sets into one combined configuration data set upon request.

The resolve function can resolve rules in configuration data to determine a concrete configuration data set. A concrete configuration data set can have one or more key-value pairs (or the equivalent). A key-value pair has a key name and a value associated with the key name. For example, if a game has a player name variable "PName" that can be set using an application-specific configuration data set, then the following key-value pair can set the player name to MyMonster:

PName="MyMonster".

Rules in configuration data sets can operate on data provided by key-value pairs in the configuration data and/or on data provided by a context for the application and the device executing the application. For example, the following configuration data set excerpt defines a key-value pair for a "BlueOrYellowBack" key name and uses a rule operating on the value for BlueOrYellowBack to control a background color specified using a "BGColor" key-value pair:

```
BlueOrYellowBack = BLUE
if (BlueOrYellowBack = BLUE) then
    BGColor = BLUE
else
    BGColor = YELLOW
end if
```

A configuration data set that has one or more rules can be called a template configuration data set; in contrast, a concrete configuration data set has no rules, but only key-value pairs (or their equivalent). In the above example, the resolver function can determine that BlueOrYellowBack is set to BLUE, which will lead to the BGColor value to be set to BLUE, and so resolve the above excerpt into two key-value pairs as follows:

BlueOrYellowBack=BLUE

BGColor=BLUE

The context of the application and device can include information about the application, such as a name and/or version number for the application, information about the device executing the application, such as device ID, memory, processor, and networking data related to the device, information about the location where the application is being executed, such as time zone information, country information, currency used at the location, and perhaps other information.

As an example, if the application is being executed in Finland, then the resolver function can resolve the following configuration data set rule based on a context key-value pair with a key name of "context.country" and a corresponding value of "Finland" to resolve the following rule:

```
if (context.country = "USA") then
    Anthem_file = StarSpangledBanner.mp3
else if (context.country = "Finland") then
    Anthem_file = Maamme.mp3
else if (context.country = "Canada") then
    Anthem_file = OhCanada.mp3
else if (context.country = "Slovakia") then
    Anthem_file = NadTatrouSaBlyska.mp3
else
    Anthem_file = NotIn2010HockeyMedalRound.mp3
end if
```

The resolver function can resolve the above rule for "Finland" to the following single key-value pair:

Anthem_file=Maamme.mp3

The merge function can receive configuration data sets that may have overlapping keys and merges them into a single data set without overlapping keys. Two or more key-value pairs have overlapping keys if they share a common key name, such as shown in the excerpt below for an overlapping "Name" key:

Name="First"
Name="Second"

The merge function can use one or more algorithms and policies for merging configuration data sets. As one example, the merge function can assign a priority to each configuration data set. Then, in case of overlapping keys/key name conflict, the merge function can select a value from the highest (or lowest) priority configuration data set having a key-value pair with the common key name. In another example, merge rules can be specified to implement a particular merge policy.

The herein-described configuration systems can use the bundle, resolve, and merge functions to transform multiple template and concrete configuration data sets from multiple sources and arriving at different times into a single concrete configuration data set for use by the application. These functions enable configuration data for applications to be provided by multiple systems. For example, an application can have a base configuration provided by one source that is later combined with configuration data for personalization and/or testing/experimental use of the application. By generating a concrete configuration data set, the configuration system can reduce or even eliminate any burden on the application related multi-source configuration data.

Example Configuration Systems

FIG. 1 shows example configuration data sets 100, 110, 120, 130, 160 and context 150 for the configuration data sets, in accordance with an example embodiment. Configuration data sets can specify information related to various aspects of an application. For example, configuration data set (CDS) 100 includes two key-value pairs to specify data for the application and two rules that can be resolved to provide additional data for the application. Key-value pair 102 specifies data using a format of "key_name=value(s)", where key_name is an arbitrary label, and value(s) can be a string, integer, list of values, a collection of sub-key-value pairs, or other value(s). In the example of key-value pair 102, the key name is "Key_name1" and the value is "value1".

A rule, such as rule 104, can include one or more expressions that that refer to key names, values, and data that is part of a context related to the application, in order to determine configuration data values. The context can include various attributes (described herein as "context") that may be specific for each device or general functions such as time, random subset selection, and perhaps other attributes.

A configuration data set can have related metadata, such as, but not limited to, information about a time/date of creation of the configuration data set, information about one or more authors of the configuration data set, information about tool(s) used in generation the configuration data set), information about one or more entities, such as a source entity or a distribution entity, related to the configuration data set, and a priority of the configuration data. For example, FIG. 1 shows metadata 106 has information related to a time and date of creation for configuration data set 100, indicating that configuration data set was created on "16 Jul. 2015" at a time of "01:23 PDT". Metadata 106 has information about entities related to configuration data set 100, including that a source entity that created configuration data set 100 was "config_vendor12" and that a distribution entity that provided configuration data set 100 was "config_download77". Also, metadata 106 has information about authorship of configuration data set 100, including an indication that no configuration tools were used in creating configuration data set 100 with metadata indicating that a "Source_tool" is "none"; that is, metadata 106 indicates that configuration data 100 is created by hand. According to metadata 106, the author of configuration data set 100 was "config_person223".

Many other examples of information can be part of metadata 106. In other embodiments, other representations of metadata than a key-value pair representation as shown in FIG. 1 are possible as well; e.g., a markup language representation using HyperText Markup Language (HTML), eXtended XML, or another markup language, a representation using a database, such as a metadata table/relation with rows/tuples storing specific values for the metadata.

As another example of using key-value pairs to provide data to an application, configuration data set 110 includes four key-value pairs 112, 114, 116, 118 that respectively specify a single value for "speed" of "4", a string value for "secret_phrase" of "to be or not to be", a set of values for "ball sizes" of "[5, 18, 45, 75]", and a set of key-value pairs for "country_codes" of "{us=1 kz=7}" for the software application. In other examples, a key-value pair can have a value, such as "none", that can be designated to representing an unused value and/or unused key-value pair.

A configuration data set without rules (e.g., only having key-value pairs and equivalents) can be classified as a concrete configuration data set (CCDS), while a configuration data set that includes rules can be classified as a template configuration data set (TCDS). For example, configuration data sets 110, 120, and 130 do not include rules and so can be classified as concrete configuration data sets. In contrast configuration data sets 100 and 160 do include rules and so can be classified as template configuration data sets.

In some case, configuration data sets can specify a namespace, or a top level key name. Namespaces can be used to avoid naming conflicts between non-related configuration keys; that is, two configuration keys K1 and K2 have a naming conflict if, after K1 is defined, K2 is created or used an identifier that was previously defined for use by K1. For example, FIG. 1 shows configuration data set 120 specifying two namespaces: "games" and "network" to avoid a naming conflict for the key name of "speed" between key-value pairs 122 and 124. Key-value pair 122 uses the games namespace to specify a key name of "games:speed", while key-value pair 124 uses the network namespace to specify a key name of "network:speed". As the "games:speed" key name is distinct from the "network:speed" key name, the keys specified by key-value pairs 122 and 124 are not in conflict. As another example, if configuration data set 120 did not specify the "games" and "network" namespaces, then a key-value pair KVP1 corresponding to key-value pair 122 would be "speed=10" and a key-value pair KVP2 corresponding to key-value pair 124 would be "speed='1 mbs'". Then, key-value pair KVP2's use of the key "speed" would lead to a naming conflict with the previously defined key "speed" of key-value pair KVP1, and so key-value pair KVP2 would be in conflict with key-value pair KVP1.

In other examples, configuration data sets can use other formats than key-value pairs to provide data; for example, concrete configuration data set 130 uses data base relation 132 and rows 134-142 having two fields: key name and value to provide data related to five keys for an application: the keys have names including "Name", "Cur HP", "Max HP", "Level", and "Class" with respective values of "Annie", "32", "240", "13", and "Wizard" as indicated in rows 134-142. Many other formats for providing configuration data and rules in configuration data sets are possible as well.

FIG. 1 shows that template configuration data set 160 includes key-value pairs 162 and 168 and rules 164 and 168. Key-value pair 162 sets a value of "X1" to "1". When this information is applied to resolve rule 166, the first condition "if (X1=0)" fails, but the second condition "else if (X1=1)" succeeds. The result of resolving rule 166 is a key-value pair of "background_color=yellow".

The configuration system can look at contextual data, such as context 150, to resolve rule 164. Context 150 includes key-value pairs with data about the device executing the application (e.g., a "device_name" key-value pair, a "num_cores" key-value pair specifying a number of cores (CPUs) on the device, a "GPUs" key-value pair specifying a number of graphics processing units (GPUs) on the device, a "RAM_in_GBs" key-value pair specifying an amount of memory in gigabits (GBs)), about the network connected to the device (e.g., an "IP_address" key-value pair specifying an Internet Protocol (IP) address for the device, a "max_B-W_in_Mbps" key-value pair specifying maximum network bandwidth available to the device in megabits per second (Mbps)), and about the usual and/or actual location of the device (e.g., city, state_prov (for state/province), country, time zone, and currency). Other data related to the device, the application, and an environment around the device/application can be provided in context 150 as well.

With respect to rule 164, the "context.country" value can be resolved by looking for the "country" key-value pair of context 150 to determine that "context.country" is "USA". When this information from context 150 is applied to resolve rule 164, the first condition "if ((context.country='UK') or (context.country='USA'))" succeeds. Then, the result of resolving rule 164 is two key-value pairs: a key-value pair of "units='inch'" and a key-value pair of "ball_sizes=[1, 1.5, 2]".

In this example, temple configuration data set 160 can be resolved using the information present in context 150 and key-value pair 162 to a concrete configuration data set having four key-value pairs:
X1=1
units="inch"
ball_sizes=[1, 1.5, 2]
background_color=yellow
X2=4

Many other examples of contexts, concrete configuration data sets, and template configuration data sets are possible as well.

Figure 2A:
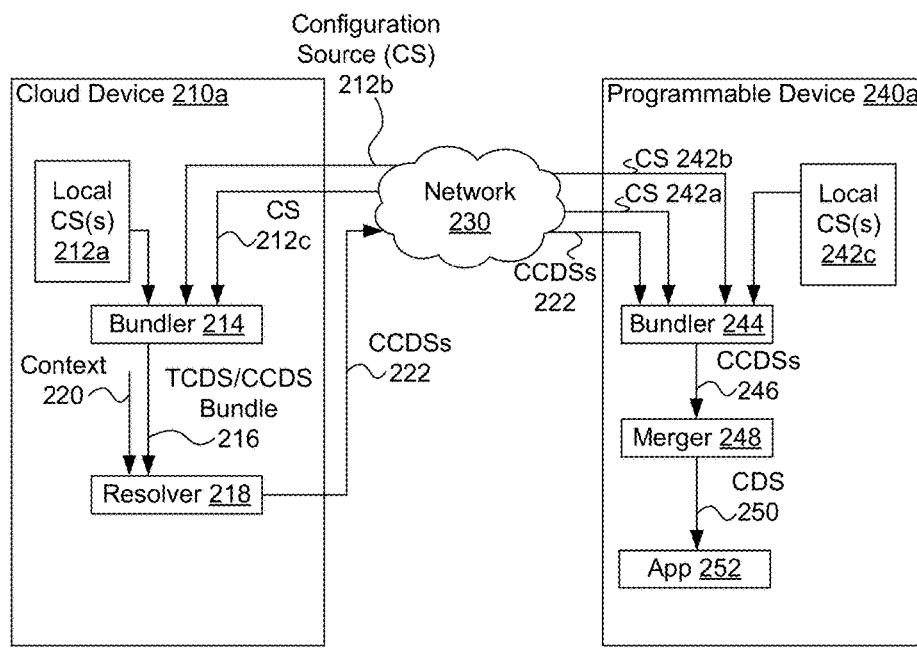
FIG. 2A shows data flow in an example configuration system, in accordance with an example embodiment.

FIG. 2A shows data flow in configuration system 200a, in accordance with an example embodiment. The example data flow involves configuration data for a single application type; in other examples, parallel data flows for a large number of application types can be used. FIG. 2A shows that cloud device 210a can provide bundler 214 with configuration data sets stored as local configuration source 212a and/or provided by remote configuration sources (CSs) 212b and 212c using network 230. Bundler 214 can receive and store configuration data, such as template and concrete configuration data sets. Then, bundler 214 can retrieve and combine template and concrete configuration data sets into a bundle to be passed as template configuration data set/concrete configuration data sets (TCDS/CCDS) bundle 216 to resolver 218. Resolver 218 can convert template configuration data sets in bundle 216 to corresponding concrete configuration data sets, perhaps in reliance of data in context 220. The resulting bundle of concrete configuration data sets is shown in FIG. 2A as concrete configuration data sets 222.

Concrete configuration data sets 222 can be communicated via network 230 to bundler 244 on programmable device 240a. Bundler 244 can accept and store concrete configuration data sets 220, as well as concrete configuration data sets provided by remote configuration sources 242a, 242b via network 230 and/or provided by local configuration source(s) 242c. Bundler 244 can generate a bundle of concrete configuration data sets, shown in FIG. 2A as concrete configuration data sets 246, and provide the bundle to merger 248. Merger 248 can combine concrete configuration data sets 246 into a single configuration data set 250 and provide configuration data set 250 for use by application 252.

Each of cloud devices 210a and 210c can include some or all of the aspects of computing device 700 discussed below in the context of FIG. 7A, including but not limited to a processor(s) such as one or more processors 703, and data storage such as data storage 704. The data storage for each of cloud devices 210a and 210c can store computer readable instructions, such as computer readable instructions 706 of computing device 700 discussed below in the context of FIG. 7A. The computer readable instructions of cloud device 210a can, when executed by the one or more processors of cloud device 210a cause cloud device 210a to perform at the least the herein-described functions bundler 214 and resolver 218. The computer readable instructions of cloud device 210c can, when executed by the one or more processors of cloud device 210c cause cloud device 210c to perform at the least the herein-described functions of local configuration source(s) 212a, bundler 274, merger 276, and resolver 218.

Each of programmable devices 240a, 240b, and 240c can include some or all of the aspects of computing device 700 discussed below in the context of FIG. 7A, including but not limited to a processor(s) such as one or more processors 703, and data storage such as data storage 704. The data storage for each of programmable devices 240a, 240b, and 240c can store computer readable instructions, such as computer readable instructions 706 of computing device 700 discussed below in the context of FIG. 7A. The computer readable instructions of programmable device 240a can, when executed by the one or more processors of programmable device 240a cause programmable device 240a to perform at the least the herein-described functions of bundler 244, merger 248, and application 252. The computer readable instructions of programmable device 240b can, when executed by the one or more processors of programmable device 240b cause programmable device 240b to perform at the least the herein-described functions of bundler 244, merger 248, application 252, and resolver 264. The computer readable instructions of programmable device 240c can, when executed by the one or more processors of programmable device 240c cause programmable device 240c to perform at the least the herein-described functions of application 252 and configuration manager 270.

Figure 2B:
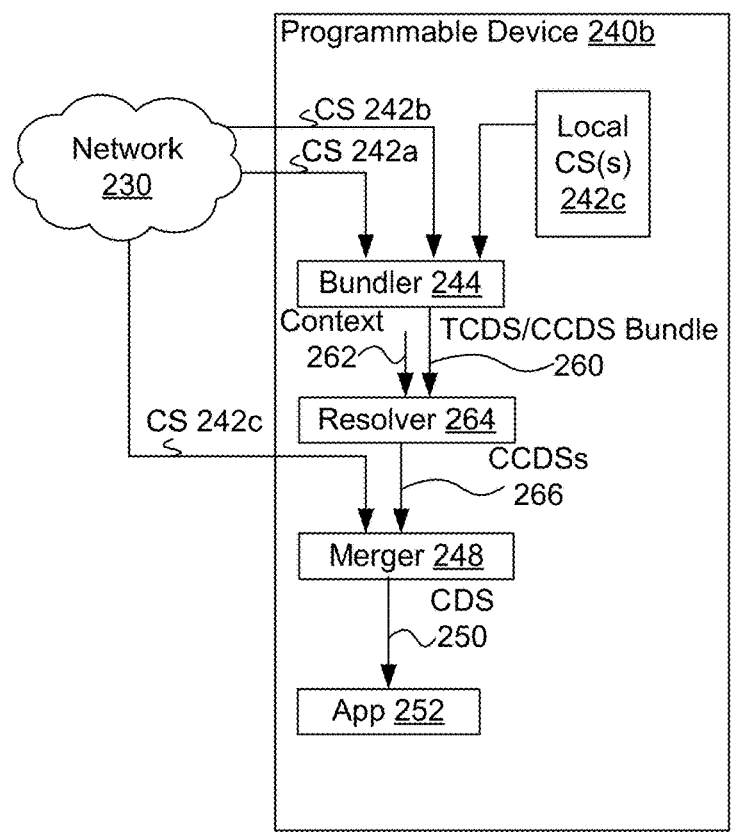
FIG. 2B shows data flow in another example configuration system, in accordance with an example embodiment.

FIG. 2B shows data flow in configuration system 200b, in accordance with an example embodiment. In comparison to configuration system 200a, more of the functionality of configuration system 200b is located on programmable device 240b than in configuration system 200a. As with configuration system 200a, the example data flow shown in FIG. 2B for configuration system 200b involves configuration data for a single application type; in other examples, parallel data flows for a large number of application types can be used.

FIG. 2B shows that programmable device 240b can provide bundler 244 with configuration data sets stored as local configuration source 242c and/or provided by remote configuration sources 242a and 242c using network 230. Bundler 244 can receive and store configuration data, such as template and concrete configuration data sets. Then, bundler 244 can retrieve and combine template and concrete configuration data sets into a bundle to be passed as template configuration data set/concrete configuration data sets bundle 260 to resolver 264. Resolver 264 can convert template configuration data sets in bundle 260 to corresponding concrete configuration data sets, perhaps in reliance of data in context 262. The resulting bundle of concrete configuration data sets is shown in FIG. 2B as concrete configuration data sets 266 to merger 248. Merger 248 can combine concrete configuration data sets 266 into a single configuration data set 250 and provide configuration data set 250 for use by application 252.

Figure 2C:
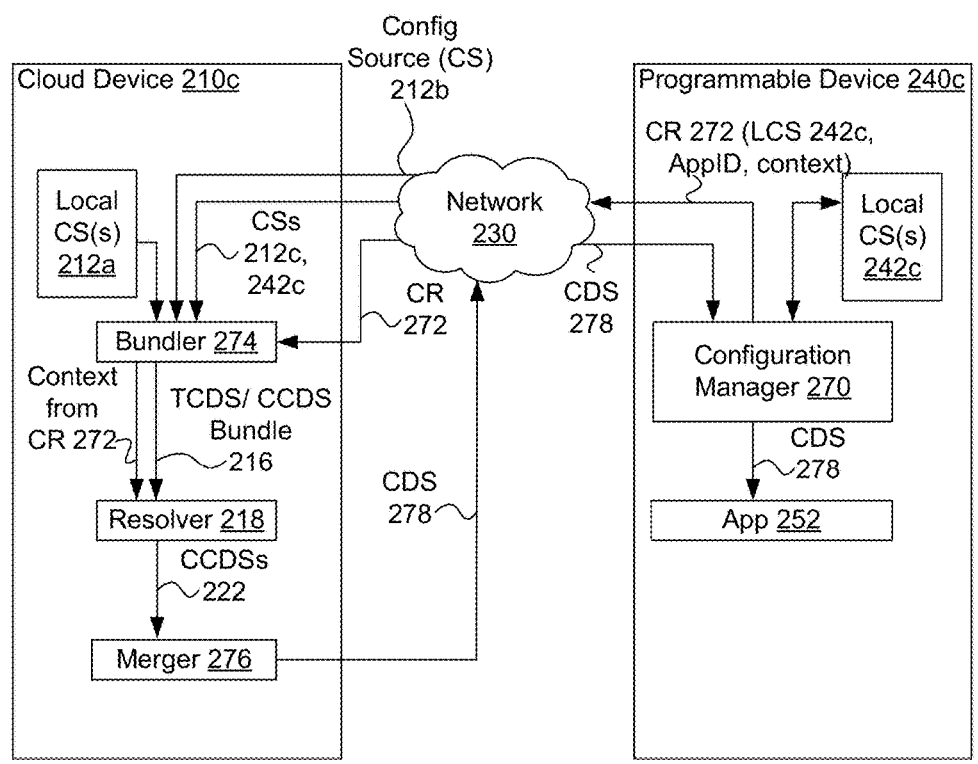
FIG. 2C shows data flow in yet another example configuration system, in accordance Zwith an example embodiment.

FIG. 2C shows data flow in configuration system 200c, in accordance with an example embodiment. In comparison to configuration systems 200a and 200b, more of the functionality of configuration system 200c is located on cloud device 210c than in either configuration system 200a or configuration system 200b. As with configuration systems 200a and 200b, the example data flow shown in FIG. 2C for configuration system 200c involves configuration data for a single application type; in other examples, parallel data flows for a large number of application types can be used.

FIG. 2C shows that cloud device 210c can provide bundler 274 of cloud device 210c with configuration data sets stored as local configuration source 212a and/or provided by remote configuration sources 212b and 212c using network 230. Bundler 274 can also receive a configuration request (CR), from a computing device, such as such as configuration request 272 from programmable device 240c. Configuration request 272 can include data from local configuration source(s) 242c of programmable device 240c, an application identifier for application 252, and a context. FIG. 2C shows that configuration request 272 is provided to cloud device 210c using configuration manager 270 of programmable device 240c and network 270; in other embodiments, application 252 and/or other component(s) of programmable device 240c can provide the herein-described functionality of configuration manager 270.

Bundler 274 can receive and store configuration data, such as template and concrete configuration data sets and/or data from local configuration source 242c provided in configuration request 242c. Then, bundler 274 can retrieve and combine template and concrete configuration data sets for an application as indicated by the application identifier of configuration request 272 into a bundle to be passed as template configuration data set/concrete configuration data sets bundle 216 to resolver 218. Bundler 274 can also provide the context from configuration request 272 to resolver 218, either separately from bundle 216 as shown in FIG. 2C or as part of bundle 216. Resolver 218 can convert template configuration data sets in bundle 216 to corresponding concrete configuration data sets, perhaps in reliance of data in the context from configuration request 272 and/or other context(s), such as context 220 discussed above regarding FIG. 2A. The resulting bundle of concrete configuration data sets is shown in FIG. 2C as concrete configuration data sets 222.

Merger 276 of cloud device 210c can combine concrete configuration data sets 220 into single configuration data set 278 and provide configuration data set 278 to programmable device 240c via network 230. In some embodiments, configuration data set 278 can be utilized as a response to configuration request 272. On programmable device 240c, configuration manager 270 can receive and perhaps store configuration data set 278 and then provide configuration data set 278 to application 252 for its use.

Data can flow through configuration systems 200a, 200b and/or 200c in various ways. For example, data can be "pushed" and/or "pulled" through configuration systems 200a, 200b and/or 200c. Data can be transferred on demand, can be transferred using background processing, using synchronized data transfer (e.g., one or more entire configuration data sets can be passed at the same time) and/or can be transferred in a staggered fashion (e.g., different pieces of data can be transferred through part or all of configuration systems 200a, 200b and/or 200c at different times). Other topologies and data flows than configuration systems 200a, 200b, 200c are possible as well.

Figure 3A:
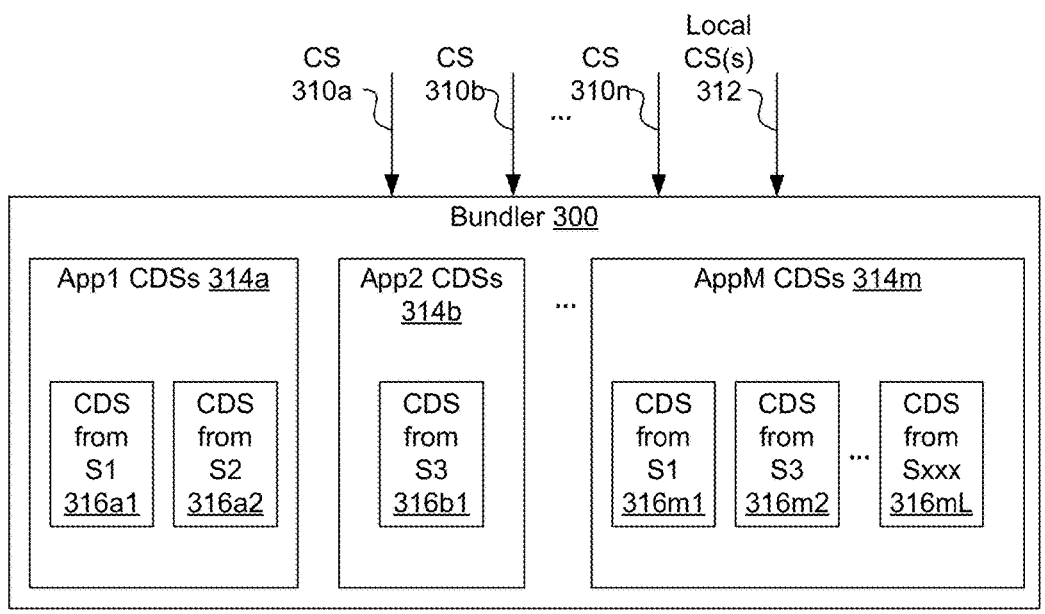
FIG. 3A shows a block diagram of an example bundler for a configuration system, in accordance with an example embodiment.

FIG. 3A shows a block diagram of bundler 300 of a configuration system, in accordance with an example embodiment. Bundler 300 can store one or more configuration data sets for each of M software applications arriving from N different sources, where M>0 and N>0. In some embodiments, bundler 300 can perform some or all of the functionality of bundler 214, bundler 244, and/or bundler 274, which are discussed above in the context of FIGS. 2A-2C.

Bundler 300 can receive configuration data, such as configuration data sets, from configuration sources 310a, 310b . . . 310n and local configuration source(s) 312 and store the received configuration data. For example, bundler 300 can store configuration data in one or more buckets. In some embodiments, a bucket can store one configuration data set or bundle of configuration data sets received from a particular source (for a particular application). Then, when the particular source sends another configuration data set or bundle of configuration data sets (for the particular application), the previously-stored configuration data set(s) (for the particular application) can be overwritten by the newly-received configuration data set(s).

Bundler 300 can arrange buckets by configuration-data source, by application, by both application and configuration-data source, or using another organizational technique. For example, FIG. 3A shows bundler 300 storing at least six buckets of configuration data set(s) by both application and source: two buckets 316a1, 316a2 for application App1, one bucket 316b1 for application App2, and three or more buckets for application AppM 316m1, 316m2, . . . 316mL. In the example shown in FIG. 3A, M>2 and L>2, while in other examples, M and/or L can be less than or equal to 2.

In some embodiments, bundler 300 can store configuration data using a database, such as a relational database, using one or more tables or other data structures. In the example of a relational database, the bundler can store a bucket relation, where each bucket can be identified using a unique value in a column representing the bucket relation. In still other embodiments, other data structures, software objects, and/or storage techniques can be used to implement part or all of bundler 300.

Figure 3B:
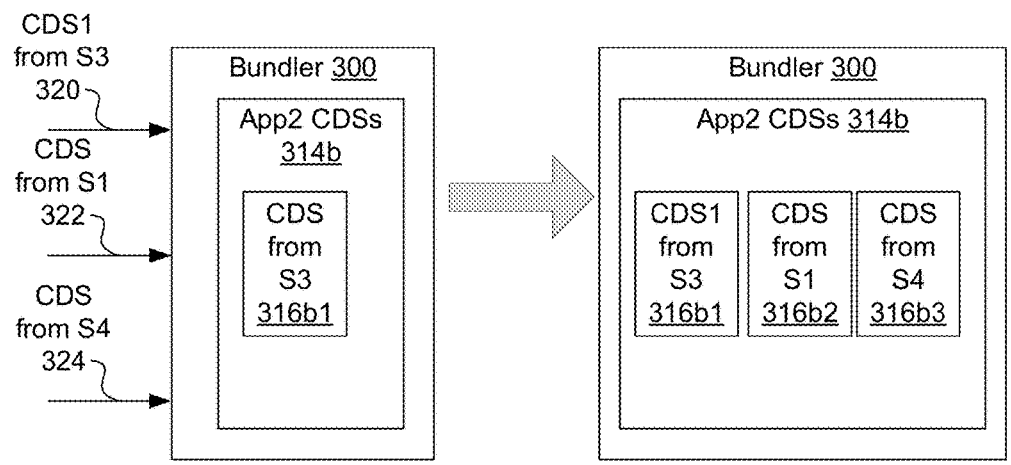
FIG. 3B shows an example use of the bundler of FIG. 3A for storing configuration data sets, in accordance with an example embodiment.

FIG. 3B shows an example use of the bundler of FIG. 3A for storing configuration data sets, in accordance with an example embodiment. Bundler 300 can store each configuration data set in a logical bucket that is related to a source for the configuration data set, such as discussed above in the context of FIG. 3B.

When another configuration data set arrives from a source, the previous content of that bucket in that bundle can be replaced by the arriving configuration data source. FIG. 3B shows that, while storing CDS from source S3 in bucket 316b1, bundler 300 receives additional configuration data for application App2, including configuration data set(s) CDS1 from source S3 320, configuration data set(s) CDS from source S1 322, and configuration data set(s) CDS from source S4 324. Bundling of configuration data sets does not have to be performed at the same time; in this example, configuration data sets 320, 322, and 324 can arrive at the substantially the same time or at different times.

Upon reception of configuration data sets 320, 322, and 324, bundler 300 can store the configuration data sets in three buckets 316b1, 316b2, and 316b3 corresponding to respective sources S3, S1, and S4 of the configuration data sets. Bucket 316b1 had been created previous to reception of configuration data set 320 and was used to store configuration data set(s) CDS from source S3. Upon reception of configuration data set(s) CDS1 from source S3 320, bundler 300 can write configuration data set(s) CDS1 from source S3 320 to bucket 316b1, thereby overwriting configuration data set(s) CDS from source S3. Upon reception of respective configuration data set(s) CDS from source S1 322 and configuration data set(s) CDS from source S4 324, bundler 300 can create respective buckets 316b2 and 316b3 for respective sources S1 in order to store respective configuration data set(s) 322 and 324.

To the right of the gray arrow of FIG. 3B, bundler 300 is shown after storing the configuration data sets received from sources S1, S3, and S4, with bucket 316b1 storing CDS1 from source S3, bucket 316b2 storing CDS from source S1, and bucket 316b3 storing CDS from source S4.

Figure 3C:
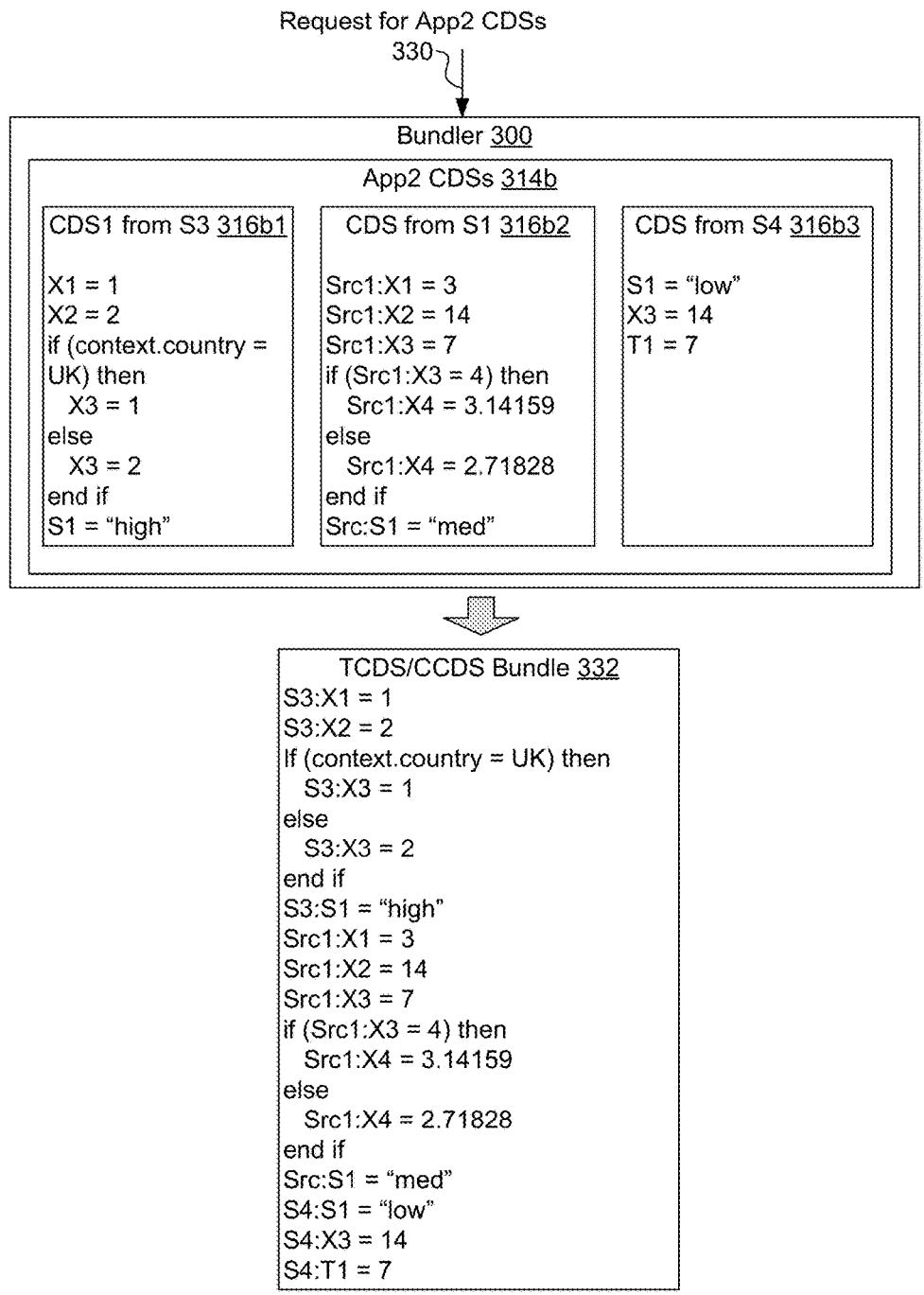
FIG. 3C shows a detailed example use of the bundler of FIG. 3A for providing configuration data sets, in accordance with an example embodiment.

FIG. 3C shows a detailed example use of bundler 300 for providing configuration data sets, in accordance with an example embodiment. Continuing the example discussed in FIG. 3B, the top portion of FIG. 3C shows the configuration data sets stored by bundler 300 for application app2 in buckets 316b1, 316b2, 316b3.

Bucket 316b1 stores CDS1 from source S3, which is a template configuration data set including three key-value pairs and one rule. CDS1 from source S3 is reproduced in Table 1 below.

TABLE 1

X1 = 1
X2 = 2
if (context.country = UK) then
    X3 = 1

TABLE 1-continued else
    X3 = 2
end if
S1 = "high"

Bucket 316b2 stores CDS from source S1, which is a template configuration data set including four key-value pairs and one rule. The configuration data set uses a namespace "Src1" to specify key values in the configuration data set. CDS from source S1 is reproduced in Table 2 below.

TABLE 2

Src1:X1 = 3
Src1:X2 = 14
Src1:X3 = 7
if (Src1:X3 = 4) then
    Src1:X4 = 3.14159
else
    Src1:X4 = 2.71828
end if
Src:S1 = "med"

Bucket 316b3 stores CDS from source S4, which is a concrete configuration data set including three key-value pairs. CDS from source S4 is reproduced in Table 3 below.

TABLE 3

S1 = "low"
X3 = 14
T1 = 7

Bundler 300 can provide efficient delivery of configuration data from multiple sources by generating and communicating bundles of configuration data. In some examples, a bundle can be communicated using a single connection and a single transaction to a mobile (or other computing) device, thereby reducing radio time and improving battery life of the mobile device.

In the example shown in FIG. 3C, bundler 300 receives request 330 for a bundle of configuration data sets for application App2. In some embodiments, request 330 can be formatted in the same fashion or in a similar fashion to configuration request 272 of FIG. 2C; e.g., request 330 can provide an application identifier, local configuration data, and/or contextual data as indicated by configuration request 300. In other embodiments, bundler 300 can provide the bundle of configuration data sets for application App2 using a push model rather than the pull model indicated by FIG. 3C; e.g., the bundle can be generated and released by bundler 300 when available after arrival and storage of one or more configuration data sets. Other techniques for determining when bundle(s) of configuration data sets are to be generated and/or provided are possible as well; e.g., bundler 300 generates bundles of configuration data sets using a push model and provides the bundles to another component of a configuration system using a pull model; e.g., the other component provides bundles after receiving a request for the application and/or the configuration data for the application.

Upon receiving request 330 for a bundle of configuration data sets for application App2, bundler 300 can generate TCDS/CCDS bundle 332, which is shown below the gray arrow in FIG. 3B and reproduced below in Table 4 for convenience

TABLE 4

```
S3:X1 = 1
S3:X2 = 2
If (context.country = UK) then
    S3:X3 = 1
else
    S3:X3 = 2
end if
S3:S1 = "high"
Src1:X1 = 3
Src1:X2 = 14
Src1:X3 = 7
if (Src1:X3 = 4) then
    Src1:X4 = 3.14159
else
    Src1:X4 = 2.71828
end if
Src:S1 = "med"
S4:S1 = "low"
S4:X3 = 14
S4:T1 = 7
```

To generate a bundle for an application A1, bundler 300 can combine the contents of buckets storing configuration data sets for application A1. Specifically to generate bundle 332 for application App3, bundler 300 can take the configuration data sets from buckets 316b1, 316b2, and 316b3 in that order, apply namespaces to non-namespaced configuration data sets, and then concatenate the resulting namespaced configuration data sets.

In the example shown in FIG. 3C and Table 4, bundler 300 can use a name of a source as a namespace to avoid conflicts between key names in generated bundles. For example, the first key-value pair in configuration data source CDS1 from S3 is "X1=1", while the corresponding key-value pair in bundle 332 is "S3:X1=1", as the source name "S3" for configuration data source CDS1 has been used as a name space for CDS1. To generate bundle 332, bundler 300 applied the same namespacing technique to configuration data source CDS from source S4 as well. However, the first key-value pair of CDS from source S1 "Src1:X1=3" is provided in bundle 332 without change, as the namespace "Src1" was already used by the CDS from source S1.

Figure 4A:
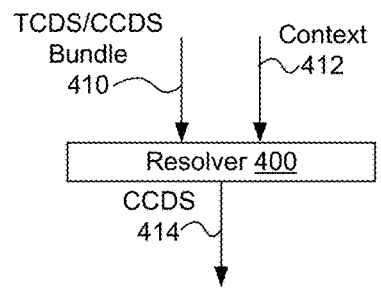
FIG. 4A shows a block diagram of an example resolver for a configuration system, in accordance with an example embodiment.

FIG. 4A shows a block diagram of resolver 400 of a configuration system, in accordance with an example embodiment. In some embodiments, resolver 400 can perform some or all of the functionality of resolver 218 and/or resolver 264, which are discussed above in the context of FIGS. 2A-2C. Resolver 400 can accept a template configuration data set and a context as inputs, and generate an output corresponding concrete configuration data set by evaluating rules in the template configuration data set and selecting only key-value pairs in the positive branches of the evaluated rules. Resolver 400 can also pass key-value pairs in the template configuration data set that are not part of a rule through to the output concrete configuration data set without modification.

FIG. 4A shows resolver 400 receiving a TCDS/CCDS bundle 410 and context 412 as inputs and providing concrete configuration data set 414 as an output. In other examples, TCDS/CCDS bundle 410 can be one (template) configuration data set, rather than a bundle of configuration data sets. Context 412 can specifying device and application attributes, such as discussed above at least regarding context 150 of FIG. 1. Resolver 400 can evaluate rules in TCDS/CCDS bundle 410 selects key/value pair(s) whose condition in the rule was evaluated as TRUE. Other implementations of resolver 400 are possible as well; e.g., resolver 400 can use a local context rather than, or along with context 412 to resolve rules in a template configuration data set; resolver 400 can resolve other kinds of rules than if-then-else conditional rules; e.g., function values, selection statements such as a C-language switch statement.

Figure 4B:
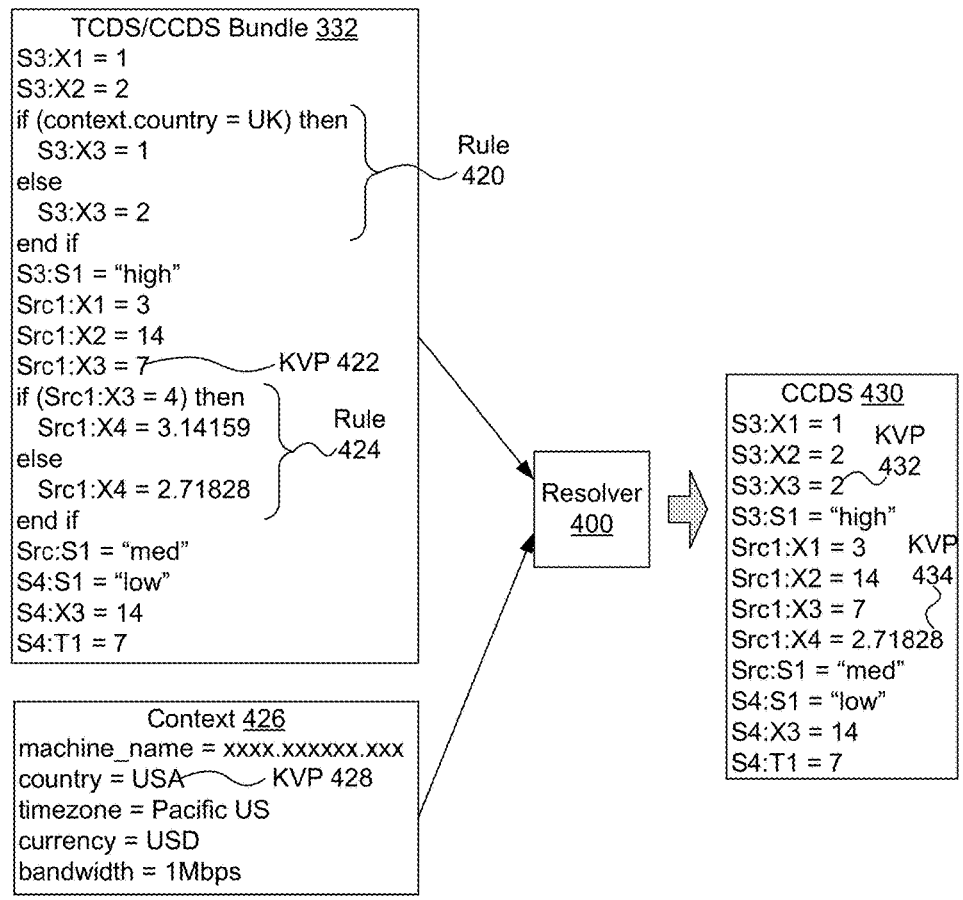
FIG. 4B shows an example use of the resolver of FIG. 4A for resolving rules in configuration data sets, in accordance with an example embodiment.

FIG. 4B shows an example use of resolver 400 for resolving rules in configuration data sets, in accordance with an example embodiment. To continue the example discussed above in the context of FIG. 3C where bundler 300 generated TCDS/CCDS bundle 332, FIG. 4B shows resolver 400 receiving TCDS/CCDS bundle 332 and context 426 as inputs. TCDS/CCDS bundle 332 is shown in FIGS. 3C and 4B, as well as in Table 4 above. Context 426 is shown in FIG. 4B and is reproduced in Table 5 below (Table 5 has a comment that begins with double slashes that is not shown in FIG. 4B).

TABLE 5

```
machine_name = xxxx.xxxxxx.xxx
country = USA // labeled as key-value pair 428 in FIG. 4B
timezone = Pacific US
currency = USD
bandwidth = 1Mbps
```

FIG. 4B shows that TCDS/CCDS bundle 332 has two rules: rule 420 and rule 424. Rule 420 is:

```
if (context.country = UK) then
    S3:X3 = 1
else
    S3:X3 = 2
end if
```

Key-value pair 428 of context 426 indicates that "country=USA"; as such, the condition "(context.country=UK)" of rule 420 evaluates to FALSE. As such, the TRUE condition of rule 420 is the else branch of the rule, which specifies a key-value pair of "S3:X3=2".

FIG. 4B shows that rule 424 is

```
if (Src1:X3 = 4) then
    Src1:X4 = 3.14159
else
    Src1:X4 = 2.71828
end if
```

To evaluate rule 424, resolver 400 can use the value "7" for key name "Src1:X3" specified in key-value pair 422 of TCDS/CCDS bundle 332. Then, evaluating rule 424 with Src1:X3 equal to 7, the condition "Src1:X3=4" of rule 422 evaluates to FALSE. As such, the TRUE condition of rule 424 is the else branch of the rule, which specifies a key-value pair of "Src1:X4=2.71828".

Resolver 400 can then generate concrete configuration data set 430 by copying key-value pairs in TCDS/CCDS bundle 332 that are not associated with rules 420 and 424 to concrete configuration data set 430 and replacing rules 420 and 424 with the key-value pairs resulting from evaluating rules 420 and 424 as discussed above. Concrete configuration data set 430 is reproduced below in Table 6 with line numbers added in Table 6 for clarity

TABLE 6

```
0001 S3:X1    = 1
0002 S3:X2    = 2
0003 S3:X3    = 2
0004 S3:S1    = "high"
0005 Src1:X1  = 3
0006 Src1:X2  = 14
0007 Src1:X3  = 7
0008 Src1:X4  = 2.71828
0009 Src:S1   = "med"
0010 S4:S1    = "low"
0011 S4:X3    = 14
0012 S4:T1    = 7
```

FIG. 4B and Table 6 show that concrete configuration data set 430 includes, in order:
 the first two key-value pairs copied from TCDS/CCDS bundle 332—e.g., "S3:X1=1" and "S3:X3=2";
 key-value pair 430 "S3:X3=2" resulting from evaluation of rule 420, as rule 420 followed the first two key-value pairs in TCDS/CCDS bundle 332;
 four key-value pairs copied from TCDS/CCDS bundle 332 that followed rule 420—e.g., "S3:S1='high'", "Src1:X1=3", "Src1:X2=14", and "Src1:X3=7";
 key-value pair 432 "Src1:X4=2.71828" resulting from evaluation of rule 424, as rule 424 followed the last of the four key-value pairs mentioned immediately above; and
 the last four key-value pairs copied from TCDS/CCDS bundle 332 that followed rule 424—e.g., "Src1:S1='med'", "S4:S1='low'", "S4:X3=14", and "S4:T1=7".

Other orderings of concrete configuration data set 430 are possible as well.

The example shown in FIG. 4B did not have conflicts between key-names, as bundler 300 had use namespacing to avoid such conflicts. In case there is a conflict between key names in a template configuration data set, resolver 400 can apply conflict resolution rules to determine a value for a representative key-value pair to represent or otherwise correspond to the conflicting key-value pairs. For example, suppose a template configuration data set received by resolver 400 includes two key-value pairs as follows:
 Key1=4
 . . .
 Key1=7

As the key "Key1" appears more than once in this example, resolver 400 can apply a conflict resolution rule to choose the value from the last identical key; e.g., a value of 7 for Key 1, a conflict resolution rule to choose the value from the first identical key; e.g., a value of 4 for Key1, a conflict resolution rule to request user input to select a value of Key1, a conflict resolution rule to defer resolution until an input, such as user input, indicates a resolved value of Key1 is required, and/or some other conflict resolution rule(s). In this example, if resolver 400 applies a conflict resolution rule to choose a value from the first identical key, resolver 400 can then generate as a representative key-value pair "Key1=4" for the two conflicting key-value pairs "Key1=4" and "Key1=7". As another example, if resolver 400 applies a conflict resolution rule to choose a an average value of all values sharing a conflicted key, resolver 400 can then generate as a representative key-value pair "Key1=5.5" for the two conflicting key-value pairs "Key1=4" and "Key1=7" having a conflicted key of "Key1". Other examples are possible.

Figure 5A:
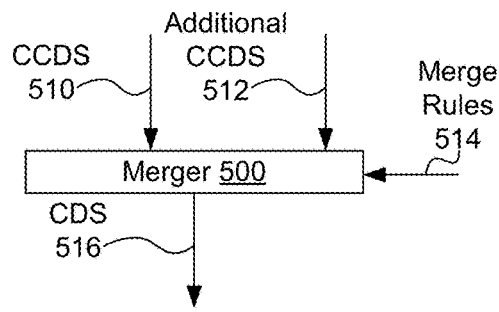
FIG. 5A shows a block diagram of an example merger for a configuration system, in accordance with an example embodiment.

FIG. 5A shows a block diagram of a merge function, merger 500, for a configuration system, in accordance with an example embodiment. Merger 500 can receive one or more concrete configuration data sets 510, 512 that may have overlapping keys and optional merge rules 514 as inputs. Then, merger 500 can generate a single concrete configuration data set 516 without overlapping keys as output. Configuration data set 516 can then be used directly by a software application. In some embodiments, merger 500 can perform some or all of the functionality of merger 248 and/or merger 276, which are discussed above in the context of FIGS. 2A-2C.

In cases where merge rules 514 are not provided, merger 500 can apply built-in merge rules. Merger 500 can use a variety of merge algorithms and policies to merge configuration data sets 510, 512 into configuration data set 516. As one example merge algorithm, merger 500 can assign a priority to each of the individual configuration data sets—then, in case of key name conflict, merger 500 can select a value from the highest priority configuration data set that contains that key name. As another example, merger 500 can keep the last key-value pair of key-value pairs having overlapping keys. Many other merge algorithms and policies are possible as well.

In some embodiments, merger 500 can assign priorities to configuration data sets in CCDS 510 and additional CCDS 512 (if present). For each key name KN in CCDS 510, 512, merger 500 can select a value V(KN) from a highest priority configuration data set in CCDS 510, 512 that has key name KN. In particular embodiments, a key-value pair having a pre-determined deletion value, such as "none" or "deleted", can indicate that the key-value pair should not be included in configuration data set 516. The use of the deletion value allows a higher priority configuration data set to delete a key that appears in a lower priority configuration data set in that bundle. In other embodiments, priorities of configuration data sets can be determined using metadata associated with some or all configuration data sets, such as metadata 106 of FIG. 1.

FIGS. 5B-5F each show an example use of merger 500 for merging configuration data sets, in accordance with an example embodiment. The example uses shown in FIGS. 5B-5F each take concrete configuration data set 430, discussed above regarding FIG. 4B and Table 6, as an input corresponding to concrete configuration data set 510 of FIG. 5A. Concrete configuration data set 430 uses namespaces to identify sources of its key-value pairs; in other examples, additional data can be used to identify a source of a key-value pair of a configuration data set, such as a source indicator for each key-value pair or a group source indicator that indicates a group of key-value pairs are associated with a common source. Many other examples of data for associating sources and key-value pairs (and rules of template configuration data sets) are possible as well.

For sake of clarity each of FIGS. 5B-5F indicates use of merge rules. In other example uses, some or all of the merge rules indicated in FIGS. 5B-5F can be built into merger 500 as one or more merge algorithms and policies. Then, in these other example uses, merge rules may not be provided to merger 500; rather, merger 500 may use the built-in merge algorithms and policies.

Figure 5B:
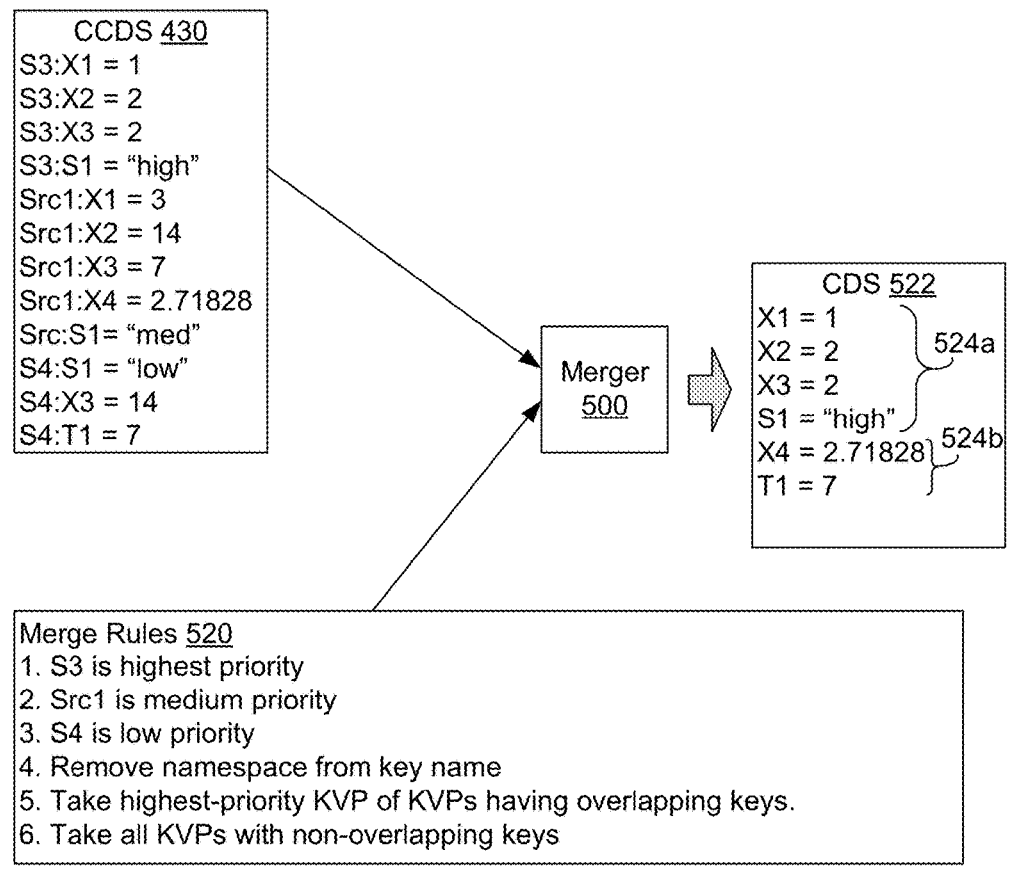
FIGS. 5B-5F each show an example use of the merger of FIG. 5A for merging configuration data sets, in accordance with an example embodiment.

FIG. 5B shows merger 500 accepting two inputs: concrete configuration data set 430 and merge rules 520. Merge rules 520 are reproduced below as Table 7.

TABLE 7

1. S3 is highest priority
2. Src1 is medium priority
3. S4 is low priority
4. Remove namespace from key name
5. Take highest-priority KVP of KVPs having overlapping keys
6. Take all KVPs with non-overlapping keys Merger 500 can apply merge rules 520 to concrete configuration data set 430 to generate configuration data set 522. After generation, configuration data set 522 can be provided by merger 500 to a software application (or other software entity).

The first three of merge rules 520 assign priorities to sources S3, S1 (named Src1), and S4, by assigning S3 as the highest priority, Src1/S1 as medium priority, and S4 as low priority. Other priority specifications are possible as well; e.g., sources can be assigned numerical priorities, alphabetic priorities (e.g., a source with an "A" priority can have higher (or lower) priority than a "B" priority and so on down the alphabet), other descriptive priorities, and/or other specification(s) of priority. In other examples, merge rules 520 may not include priority information; rather, priority information can be provided separately to merger 500, such as in a list, relation, object, data structure, metadata, or other software entity that specifies sources and corresponding priorities.

The fourth rule in merge rules 520 indicates that merger 500 is to remove namespaces from key names. For example, the non-namespaced key name "X3" is part of three key-value pairs in concrete configuration data set 430 and Table 6: the third key-value pair "S3:X3=2", the seventh key-value pair "Src1:X3=7", and the eleventh key-value pair "S4:X3=14". By removing the namespaces from the key names, these three key-value pairs each have an overlapping key of X3: X3=2, X3=7, and X3=14.

The fifth merger rule of merge rules 520 indicates that merger 500 is take the highest-priority key-value pair of key-value pairs that have overlapping keys. Continuing the example above, the non-namespaced version of the third key-value pair of concrete configuration data set 430 "X3=2", which has overlapping keys with the non-namespaced versions of the seventh key-value pair "X3=7", and the eleventh key-value pair "X3=14" of concrete configuration data set 430. Of these three key-value pairs, the third key-value pair "X3=2" has the highest source priority. Then, merger 500 can output "X3=2" to configuration data set 522, while excluding the lower-priority seventh and eleventh key-value pairs from configuration data set 522.

The sixth merger rule of merge rules 520 indicates that merger 500 is to take all key-value pairs that do not have overlapping keys. For example, the last or twelfth key-value pair of concrete configuration data set 430 has a key "T1" that does not overlap with any other key in concrete configuration data set 430. Then, merger 500 can output the key-value pair "T1=7" as a key-value pair that does not have an overlapping key.

Merger 500 can apply merge rules 520 to concrete configuration data set 430 to generate configuration data set 522, which is reproduced below as Table 8.

TABLE 8

X1 = 1
X2 = 2
X3 = 2

TABLE 8-continued

S1 = "high"
X4 = 2.71828
T1 = 7

Merger 500 can apply the first five rules of merge rules 520 to concrete configuration data set 430 to output the first four key-value pairs 524a of configuration data set 522 (and Table 8). That is, key-value pairs 524a are from highest-priority source S3, as these key-value pairs had overlapping keys in concrete configuration data set 430. The fifth and sixth key-value pairs 524b of configuration data set 522 (and Table 8) are output to concrete configuration data set 522, as these key-value pairs do not have overlapping keys in concrete configuration data set 430.

In some embodiments, some or all key-value pairs with overlapping keys can be represented by a null key-value pair that has no key and no value; that is, some or all key-value pairs that have overlapping keys can be deleted. For example, a first variation of the fifth rule of merge rules 530 can be "If overlapping keys include the letter "S", then delete the corresponding KVPs; otherwise, take highest-priority KVP of KVPs having overlapping keys." In this example, if merger 500 used the first variation of the fifth rule, then the "S1='high'" key-value pair shown in both configuration data set 522 and in Table 8 would not be output by merger 500. As a second example, a second variation of the fifth rule of merge rules 530 can be "If overlapping keys include KVPs from source S4, then delete the corresponding KVPs; otherwise, take highest-priority KVP of KVPs having overlapping keys." In this second example, then the "X3=2" and "S1='high'" key-value pairs shown in both configuration data set 522 and in Table 8 would not be output by merger 500. As a third example, a third variation of the fifth rule of merge rules 530 is "Delete all KVPs with overlapping keys.". In the third example, configuration data set 522 and Table 8 would not include any of key-value pairs 524a, and so would have only the two key-value pairs 524b of "X4=2.71828" and "T1=7" remaining. Many other example of merge rules including rules that involve deleting key-value pairs are possible as well.

Figure 5C:
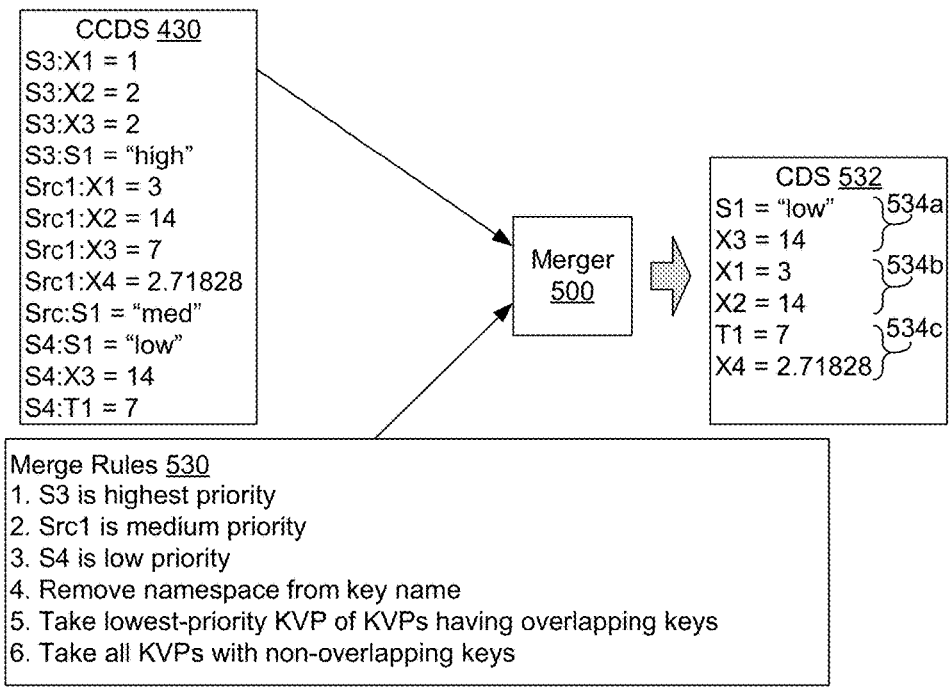

FIG. 5C shows a similar use of merger 500 to that shown in FIG. 5B to generate and output configuration data set 532, as merger 500 accepts concrete configuration data set 430 and merge rules 530 as input, and merge rules 530 are similar to merge rules 520 of FIG. 5B and Table 7, as the all but the fifth merge rule are the same in both merge rules 520 and 530. FIG. 5C shows that the fifth merge rule of merge rules 530 is "Take lowest-priority KVP of KVPs having overlapping keys". That is, while merge rules 520 prioritized taking key-value pairs with high priorities as discussed above, merge rules 530 prioritize taking key-value pairs with low priorities. After generation, configuration data set 532 can be provided by merger 500 to a software application (or other software entity).

Merger 500 can apply merge rules 530 to concrete configuration data set 430 as discussed above in the context of FIG. 5B to remove namespace data. However, rather than prioritizing high-priority source S3 when resolving overlapping keys, merger 500 can prioritize low-priority source S4. For example, after applying the fourth rule of merger rules 530, the third key-value pair of concrete configuration data set 430 is "X3=2" from high-priority source S3, the seventh key-value pair of concrete configuration data set 430 is X3=7" from medium-priority source S3, and the eleventh key-value pair of concrete configuration data set 430 is "X3=14" from low-priority source S4. Of these three key-value pairs, "X3=14" has the lowest source priority and so merger 500 can output "X3=14" to configuration data set 522, while excluding the higher-priority third and seventh key-value pairs from configuration data set 522.

Merger 500 can apply merge rules 530 to concrete configuration data set 430 to generate concrete configuration data set 532, which is reproduced below as Table 9.

TABLE 9

| | | |
|---|---|---|
| S1 | = | "low" |
| X3 | = | 14 |
| X1 | = | 3 |
| X2 | = | 14 |
| T1 | = | 7 |
| X4 | = | 2.71828 |

As indicated in FIG. 5C, merger 500 can apply the first five rules of merge rules 520 to concrete configuration data set 430 to output the first couple of key-value pairs 534a and the second couple of key-value pairs 534 of concrete configuration data set 532 (and Table 9). Key-value pairs 534a are from low-priority source S4, as these key-value pairs had overlapping keys in concrete configuration data set 430. Key-value pairs 534b are from medium-priority source Src1, as these key-value pairs had overlapping keys in concrete configuration data set 430 that did not include key-value pairs from low-priority source S4. The fifth and sixth key-value pairs 524b of configuration data set 522 (and Table 9) are output to concrete configuration data set 532, as these key-value pairs do not have overlapping keys in concrete configuration data set 430.

Figure 5D:
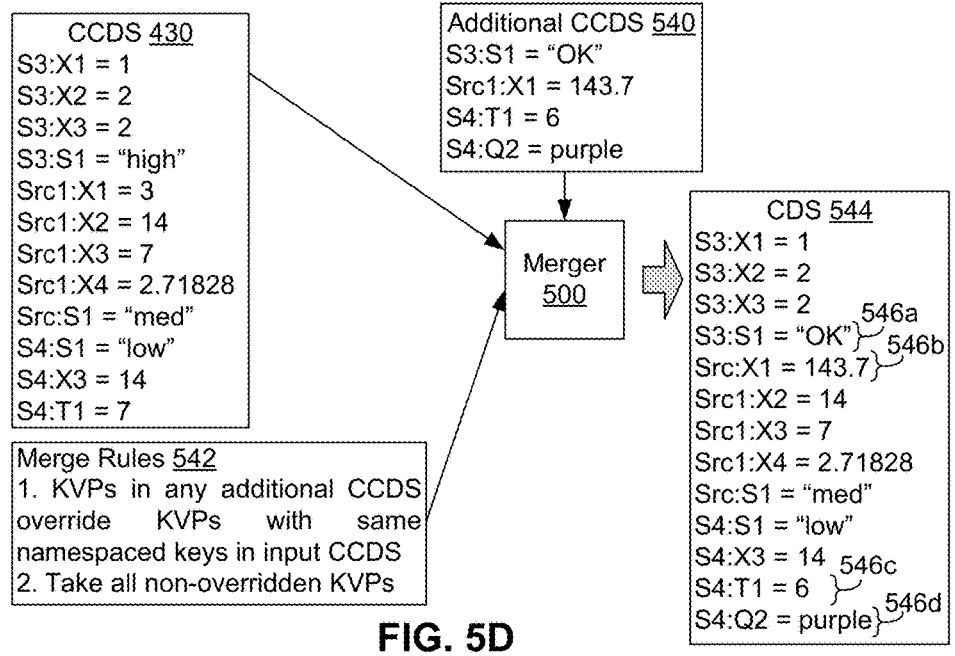

FIG. 5D shows another use of merger 500, where merger 500 accepts concrete configuration data set 430, additional concrete configuration data set 540, and merge rules 542 as inputs, and generates configuration data set 544 as an output. After generation, configuration data set 544 can be provided by merger 500 to a software application (or other software entity). Additional concrete configuration data set 540 specifies four key-value pairs using three different namespaces:
"S3:S1='OK'" using the S3 namespace,
"Src1:X1=143.7" using the Src1 namespace, and
"S4:T1=6" and "S4:Q2=purple" using the S4 namespace.

As shown in FIG. 5D, merge rules 542 has two rules. The first rule is that key-value pairs in any additional concrete configuration data set, such as additional concrete configuration data set 540, override key-value pairs with same namespaced keys in an input concrete configuration data set, such as concrete configuration data set 430. In other words, key-value pairs in additional configuration data set 540 take priority over key-value pairs in additional configuration data set 430 that share namespaced keys. The second rule is that all non-overridden key-value pairs are to be taken for output as a configuration data set.

Merger 500 can apply merge rules 542 to concrete configuration data set 430 and additional concrete configuration data set 540. The first three key-value pairs of concrete configuration data set 430, shown in FIGS. 5B-5D and Table 6, do not have a namespaced key that is the same as a namespaced key of a key-value pair in additional concrete configuration data set 540, and so are not affected by the first rule of merge rules 542. Then, merger 500 can output these three key-value pairs to configuration data set 544.

The fourth key-value pair of concrete configuration data set 430, which is "S3:S1='high'" has a namespaced key S3:S1 that matches the namespaced key S3:S1 of the first key-value pair of additional concrete configuration data set 540. As such, merger 500 can output the first key-value pair of additional concrete configuration data set 540 as indicated by key-value pair 546a of configuration data set 544. Also, merger 500 can discard the fourth key-value pair of concrete configuration data set 430, effectively overriding the fourth key-value pair of concrete configuration data set 430.

The fifth key-value pair "Src1:X1=3" and twelfth (last) key-value pair "S4:T1=7" of concrete configuration data set 430 share respective namespaced keys Src1:X1 and S4:T1 with the respective second key-value pair "Src1:X1=143.7" and third key-value pair "S4:T1=6" of additional concrete configuration data set 540. Then, merger 500 can output the respective second and third key-value pairs of additional concrete configuration data set 540 as indicated by respective key-value pairs 546b and 546c of configuration data set 544. Merger 500 can discard the respective fifth and twelfth key-value pairs of concrete configuration data set 430 to override the respective fifth and twelfth key-value pairs.

The remaining key-value pairs of concrete configuration data set 430; that is, the sixth through eleventh key-value pairs, do not share namespaced keys with key-value pairs in additional concrete configuration data set 540, and so are not overridden. Additionally, the fourth key-value pair of additional concrete configuration data set 540 "S4:Q2=purple" does not share a key with any key-value pair in concrete configuration data set 430, and so is output by merger 500 in keeping with the second merge rule of merge rules 542 as indicated by key-value pair 546d of configuration data set 544.

The resulting concrete configuration data set 544 is shown in FIG. 5D and reproduced below as Table 10.

TABLE 10

| | | |
|---|---|---|
| S3:X1 | = | 1 |
| S3:X2 | = | 2 |
| S3:X3 | = | 2 |
| S3:S1 | = | "OK" |
| Src:X1 | = | 143.7 |
| Src1:X2 | | = 14 |
| Src1:X3 | | = 7 |
| Src1:X4 | | = 2.71828 |
| Src:S1 | = | "med" |
| S4:S1 | = | "low" |
| S4:X3 | = | 14 |
| S4:T1 | = | 6 |
| S4:Q2 | = | purple |

Figure 5E:
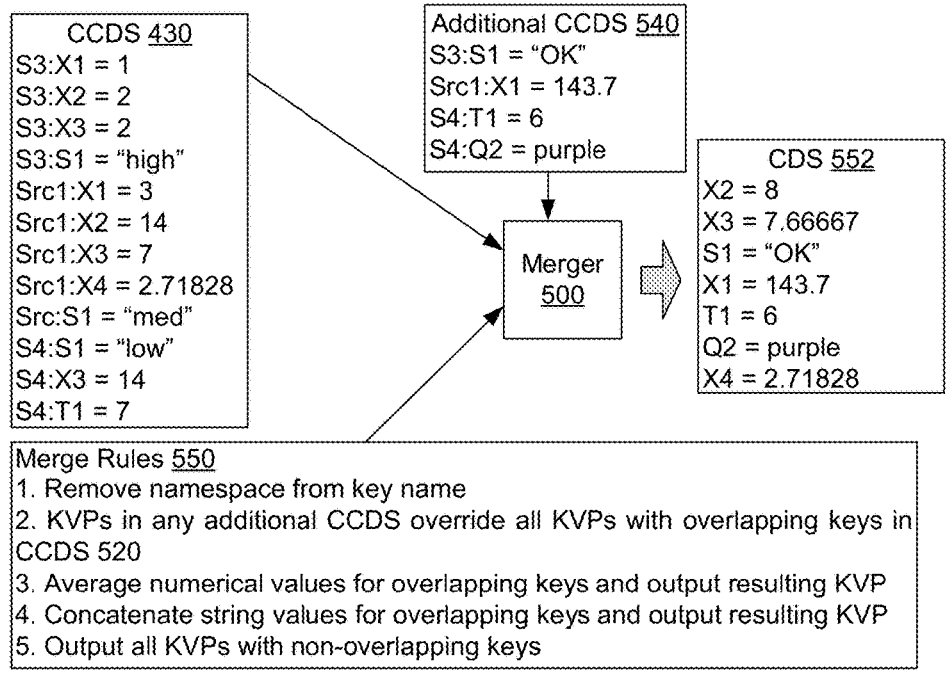

FIG. 5E shows another use of merger 500, where merger 500 accepts concrete configuration data set 430, additional concrete configuration data set 540, and merge rules 550 as inputs, and generates configuration data set 552 as an output. After generation, configuration data set 552 can be provided by merger 500 to a software application (or other software entity). Additional concrete configuration data set 540 is the same for both FIGS. 5D and 5E.

As shown in FIG. 5E, merge rules 550 has five rules. The first rule of merge rules 550 is that key-value pairs in any additional concrete configuration data set, such as additional concrete configuration data set 540, override key-value pairs with same namespaced keys in an input concrete configuration data set, such as concrete configuration data set 430, which is the same as the first rule of merge rules 542 of FIG. 5D. The second rule of merge rules 550 is to remove namespaces from key names in key-value pairs in concrete configuration data set 430 and additional concrete configuration data set 540.

The third rule of merge rules 550 is, for key-value pairs with numerical values that share a key name, merger 500 should average numerical values and generate and output a key-value pair with the shared key name and the averaged numerical value. For example, after removing namespace information, the second key-value pair "X2=2" and the sixth key-value pair "X2=14" of concrete configuration data set 430 share a key name X2, and so merger 500 should average the numerical values for these two key-value pairs to determine that the value corresponding to key name X2 in output configuration data set 552 is 8 (the average of 2 and 14) and output a key-value pair of "X2=8", as illustrated in FIG. 5E as the second key-value pair of configuration data set 552.

The fourth rule of merge rules 550 is, for key-value pairs with string values that share a key name, merger 500 should concatenate all string values and generate and output a key-value pair with the shared key name and the concatenated string value. For example, after overriding the fourth key-value pair of concrete configuration data set 430 with the first key-value pair of additional concrete configuration data set 540 and removing namespace information, three key-value pairs share a key name S1 and have string values. Those key-value pairs are the overridden fourth key-value pair "S1='OK'", ninth key-value pair "S1='med'", and tenth key-value pair "S1='low'" of concrete configuration data set 430. Concatenating the three string values of fourth, ninth, and tenth key-value pairs results in a string value of "OKmedlow", and so the resulting key-value pair is "S1='OKmedlow'", as illustrated in FIG. 5E as the fourth key-value pair of configuration data set 552.

The fifth rule of merge rules 550 is to output all key-value pairs with non-overlapping keys; that is, any key-value pairs not merged using the third and fourth rules of merge rules 500.

Merger 500 can apply merge rules 550 to concrete configuration data set 430 and additional concrete configuration data set 540 to generate configuration data set 552. In particular, merger 500 can apply the first rule of merge rules 550 to override the fourth, fifth, and twelfth (last) key-value pairs of concrete configuration data set 430 with the respective first three rules of additional concrete configuration data set 540, as discussed above in the context of FIG. 5D. Then, after applying the second of merge rules 550 to the concrete configuration data set 430 and additional concrete configuration data set 540, merger 500 can generate the list of non-namespaced key-value pairs shown in Table 11 below.

TABLE 11

| | | |
|---|---|---|
| 0001 | X1 | = 1 |
| 0002 | X2 | = 2 |
| 0003 | X3 | = 2 |
| 0004 | S1 | = "OK" |
| 0005 | X1 | = 143.7 |
| 0006 | X2 | = 14 |
| 0007 | X3 | = 7 |
| 0008 | X4 | = 2.71828 |
| 0009 | S1 | = "med" |
| 0010 | S1 | = "low" |
| 0011 | X3 | = 14 |
| 0012 | T1 | = 6 |
| 0013 | Q2 | = purple |

Applying the third rule of merge rules 550, merger 500 can find that the first and fifth key-value pairs shown in Table 11 share a key name of X1, and so can average the corresponding numerical values of 1 and 143.7 to generate and output a key-value pair of "X1=72.35", as shown as the first key-value pair of configuration data set 552. Merger 500 can apply this same averaging technique to the second and sixth key-value pairs shown in Table 11 to generate and output a key-value pair of "X2=8", shown as the second key-value pair of configuration data set 552, as well as to the third, seventh, and eleventh key-value pairs shown in Table 11 to generate and output a key-value pair of "X3=7.66667" shown as the third key-value pair of configuration data set 552.

Applying the fourth rule of merge rules 550 to the fourth, ninth, and tenth key-value pairs shown in Table 11 above, merger 500 can generate and output a key-value pair of "S1='OKmedlow'" using string concatenation, as discussed three paragraphs above, which is shown as the fourth key-value pair of configuration data set 552.

Applying the fifth rule of merge rules 550 to the eighth, twelfth, and thirteenth (last) key-value pairs in Table 11, merger 500 can output three key-value pairs "X4=2.71828", "T1=6", and "Q2=purple", which correspond to the last three key-value pairs of configuration data set 552, as shown in FIG. 5E.

Figure 5F:
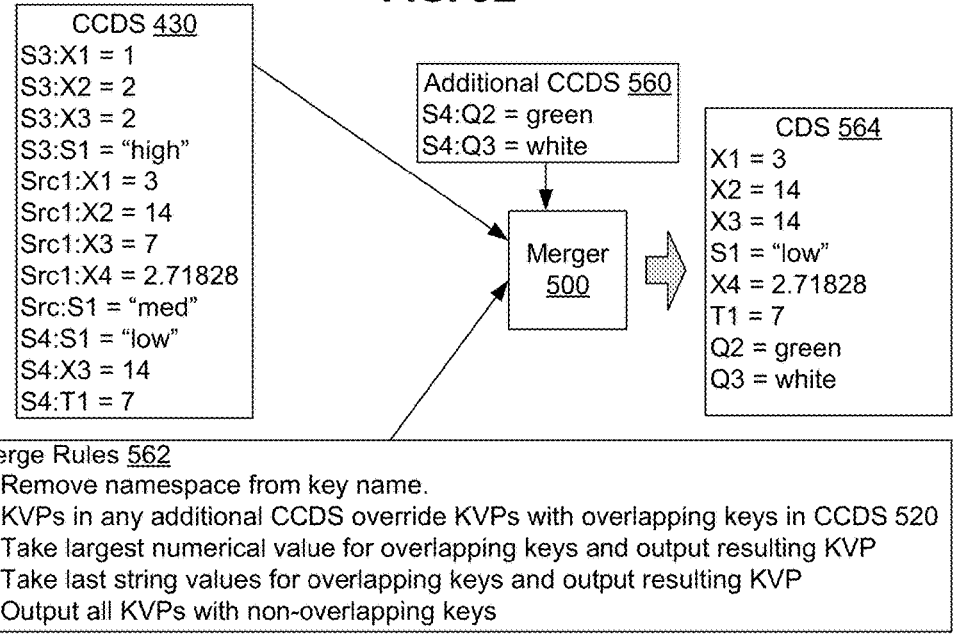

FIG. 5F shows another use of merger 500, where merger 500 accepts concrete configuration data set 430, additional concrete configuration data set 560, and merge rules 562 as inputs, and generates configuration data set 564 as an output. After generation, configuration data set 564 can be provided by merger 500 to a software application (or other software entity). Additional concrete configuration data set 560 has two key-value pairs: "S4:Q2=green" and "S4:Q3=white".

As shown in FIG. 5F, merge rules 562 has five rules. The first, second, and fifth rules of merge rules 562 are respectively the same as the first, second, and fifth rules of merge rules 550, which are discussed above in detail in the context of FIG. 5E.

The third rule of merge rules 562 is, for key-value pairs with numerical values that share a key name, merger 500 should take the largest numerical value and generate and output a key-value pair with the shared key name and the largest numerical value. Other techniques beyond taking a largest value for merging numerical values of key-value pairs are possible as well, including, but not being limited to, taking a minimum value, taking an average value (as discussed above regarding merge rules 550), taking a median value, taking a mode (most frequently occurring) value, generating a list of numerical values, taking a first, second, third, . . . , or last value of key-value pairs sharing a common key name in a configuration data set, and/or taking a value based on one or more priorities of a key-value pair (such as discussed above in the context of merge rules 520 and 530).

The fourth rule of merge rules 562 is, for key-value pairs with string values that share a key name, merger 500 should take the first of all string values and generate a key-value pair with the shared key name and the first string value. Other techniques beyond taking a first value for merging string values of key-value pairs are possible as well, including, but not limited to, concatenating string values (as discussed above regarding merge rules 550), taking a second, third, . . . , or last value of key-value pairs sharing a common key name in a configuration data set, and/or taking a value based on one or more priorities of a key-value pair (such as discussed above in the context of merge rules 520 and 530).

Merger 500 can apply merge rules 562 to concrete configuration data set 430 and additional concrete configuration data set 562 to generate configuration data set 564. After applying the first and second of merge rules 562 to the concrete configuration data set 430 and additional concrete configuration data set 560, merger 500 can generate the list of non-namespaced key-value pairs shown in Table 12 below.

TABLE 12

| | | |
|---|---|---|
| 0001 | X1 | = 1 |
| 0002 | X2 | = 2 |
| 0003 | X3 | = 2 |
| 0004 | S1 | = "high" |
| 0005 | X1 | = 3 |
| 0006 | X2 | = 14 |
| 0007 | X3 | = 7 |
| 0008 | X4 | = 2.71828 |
| 0009 | S1 | = "med" |
| 0010 | S1 | = "low" |
| 0011 | X3 | = 14 |
| 0012 | T1 | = 7 |
| 0013 | Q2 | = green |
| 0014 | Q3 | = white |

Applying the third rule of merge rules 562, merger 500 can find that the first and fifth key-value pairs shown in Table 12 share a key name of X1, and so can take the largest of the corresponding numerical values of 1 and 3 to generate and output a key-value pair of "X1=3", as shown as the first key-value pair of configuration data set 562. Merger 500 can apply this same technique to the second and sixth key-value pairs shown in Table 12 to generate and output a key-value pair of "X2=14", shown as the second key-value pair of configuration data set 564, as well as to the third, seventh, and eleventh key-value pairs shown in Table 12 to generate and output a key-value pair of "X3=14", shown as the third key-value pair of configuration data set 564.

Applying the fourth rule of merge rules 562 to the fourth, ninth, and tenth key-value pairs shown in Table 11 above, merger 500 can generate and output a key-value pair of "S1='high'", by taking the string value of the first key-value pair sharing the common key name of S1; that is, the string value of "high" found in the fourth key-value pair of Table 12. The generated key-value pair "S1='high'" can be output as the fourth key-value pair of configuration data set 564 as indicated in FIG. 5F.

Applying the fifth rule of merge rules 562 to the eighth, twelfth, thirteenth, and fourteenth (last) key-value pairs in Table 12, merger 500 can output four key-value pairs "X4=2.71828", "T1=7", "Q2=green", and "Q3=white" which correspond to the last four key-value pairs of configuration data set 564, as shown in FIG. 5F.

As discussed herein, merger 500 can use a variety of merge algorithms and policies to merge configuration data sets into a configuration data set that does not have overlapping keys. For example, merger 500 can use merge rules and/or build-in merge rules that include some or all of merge rules 520, 530, 542, 550, and 562. As such, merger 500 provides flexible functionality for resolving conflicts related to overlapping keys in configuration data sets. Many other merge algorithms and policies are possible as well.

Example Data Network

Figure 6:
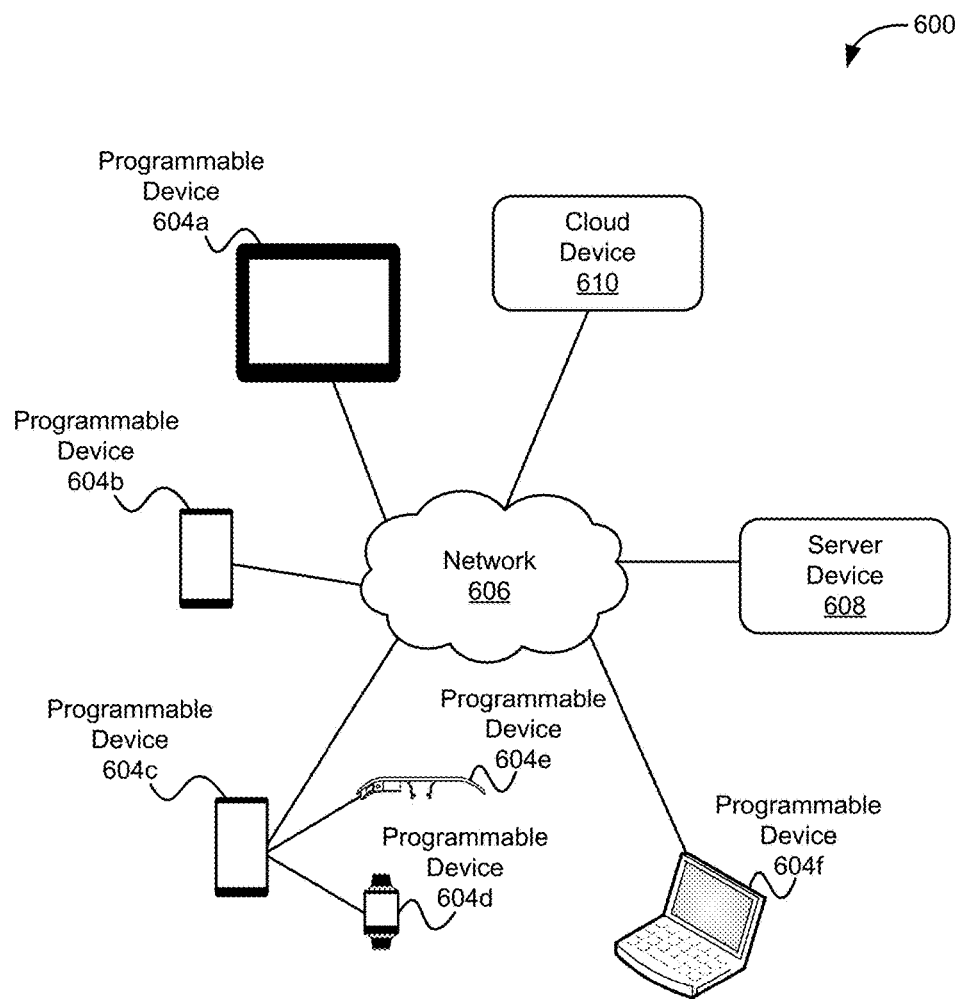
FIG. 6 depicts a distributed computing architecture, in accordance with an example embodiment.

FIG. 6 depicts a distributed computing architecture 600 with server device 608 and cloud device 610 configured to communicate, via network 606, with programmable devices 604a, 604b, 604c, 604d, 604e, and 604f, in accordance with an example embodiment. Network 606 may correspond to a LAN, a wide area network (WAN), a corporate intranet, the public Internet, or any other type of network configured to provide a communications path between networked computing devices. Network 606 may also correspond to a combination of one or more LANs, WANs, corporate intranets, and/or the public Internet.

In some examples, network 606 can provide the functionality of network 230 discussed above in the context of FIGS. 2A-2C. For example, network 606 can provide connectivity and enable communications between cloud devices, such as server device 608 and cloud devices 210a, 210c, 610, with programmable devices, such as programmable devices 240a-240c and 604a-604f.

Although FIG. 6 only shows five programmable devices, distributed application architectures may serve tens, hundreds, or thousands of programmable devices. Moreover, a programmable device, such as programmable devices 240a, 240b, 240c, 604a, 604b, 604c, 604d, 604e, and 604f (or any additional programmable devices), can be any sort of computing device; e.g., computing device 700 discussed below in the context of FIG. 7A. In some embodiments, such as indicated with programmable devices 604a, 604b, 604c, and 604f, programmable devices can be directly connected to network 606. In other embodiments, such as indicated with programmable devices 604d and 604e, programmable devices can be indirectly connected to network 606 via an associated computing device, such as programmable device 604c. In this example, programmable device 604c can act as an associated computing device to pass electronic communications between programmable devices 604d and 604e and network 606. In still other embodiments not shown in FIG. 6, a programmable device can be both directly and indirectly connected to network 606.

Server devices 608 and cloud device 610 can be configured to perform one or more services, as requested by programmable devices 604a-604f. For example, server device 608 and/or cloud device 610 can provide content and/or to programmable devices 604a-604f. The content can include, but is not limited to, web pages, hypertext, scripts, configuration data sets, binary data such as compiled software, images, audio, and/or video. The content can include compressed and/or uncompressed content. The content can be encrypted and/or unencrypted. Other types of content are possible as well.

As another example, server device 608 and/or cloud device 610 can provide programmable devices 604a-604f with access to software for database, search, software configuration, computation, graphical, audio, video, World Wide Web/Internet utilization, and/or other functions. Many other examples of server devices are possible as well.

Computing Device Architecture

Figure 7A:
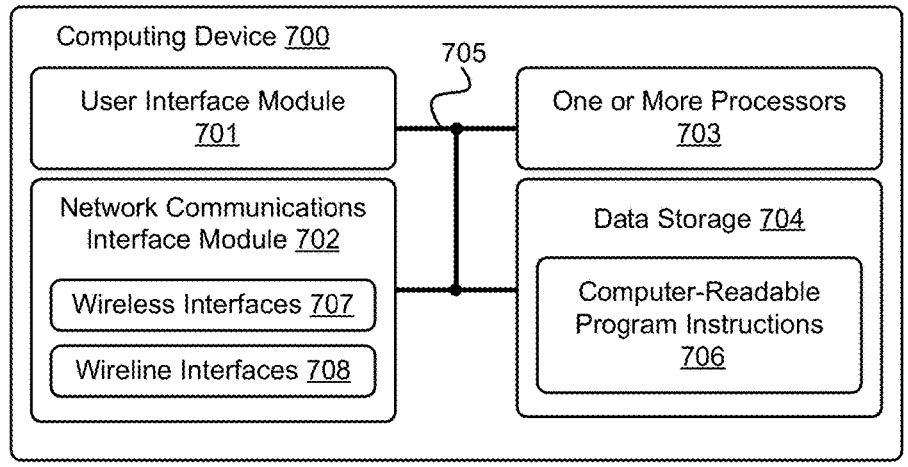
FIG. 7A is a block diagram of a computing device, in accordance with an example embodiment.

FIG. 7A is a block diagram of a computing device 700 (e.g., system) in accordance with an example embodiment. In particular, computing device 700 shown in FIG. 7A can be configured to perform one or more functions related to configuration systems 200a, 200b, 200c, cloud devices 210a, 210b, 210c, 610, configuration sources 212a, 212b, 212c, 242a, 242b, 242c, bundlers 214, 244, 274, 300, resolvers 218, 264, 400 networks 230, 606, programmable devices 240a, 240b, 240c, mergers 248, 276, 500, application 252, configuration manager 270, programmable devices 604a-604f, server device 608, and method 800.

A computing device, such as computing device 700, can be or include any machine performing calculations automatically, such as, but not limited to, a desktop computer, a laptop computer, a tablet, a mobile phone, a smart phone, a watch, a smart watch, a headset, a wearable computing device, a mobile computing device, a head-mountable device (HIVID) such as smart glasses, a network terminal, a wireless communication device (e.g., a smart phone or cell phone), a server, and so on.

A programmable device can be any sort of computing device. A mobile computing device is any computing device that includes a mobile source of power, such as a battery—examples include, but are not limited to, laptop computers, tablets, mobile phones, smart phones, watches, smart watches, headsets, vehicle infotainment system, and HMDs. An immobile computing device is a computing device that is not a mobile computing device—examples include, but are not limited to, desktop computers, home entertainment systems, smart thermostats, servers, and appliance computers. A wearable computing device is a computing device designed to be carried on and/or by a person or animal—examples include, but are not limited to, mobile phones, smart phones, watches, smart watches, headsets, and HMDs.

Computing device 700 may include a user interface module 701, a network-communication interface module 702, one or more processors 703, and data storage 704, all of which may be linked together via a system bus, network, or other connection mechanism 705.

User interface module 701 can be utilized to send data to and/or receive data from exterior user input/output devices. For example, user interface module 701 can be configured to send and/or receive data to and/or from user input devices such as a keyboard, a keypad, a touch screen, a computer mouse, a trackball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors (e.g., central processing units) and/or one or more special purpose processors (e.g., digital signal processors, graphics processing units, application specific integrated circuits, etc.). Processors 703 can be configured to execute computer-readable program instructions 706 that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706 and perhaps additional data. In some embodiments, data storage 704 can additionally include storage required to perform at least part of the herein-described scenarios, methods, and techniques and/or at least part of the functionality of the herein-described devices and networks.

In some embodiments, computing device 700 can include one or more sensors. The sensor(s) can be configured to measure conditions in an environment for computing device 700 and provide data about that environment. The data can include, but is not limited to, location data about computing device 700, velocity (speed, direction) data about computing device 700, acceleration data about computing device, and other data about the environment for computing device 700. The sensor(s) can include, but are not limited to, Global Positioning System (GPS) sensor(s), location sensors(s), gyroscope(s), accelerometer(s), magnetometer(s), camera(s), light sensor(s), infrared sensor(s), and microphone(s). Other examples of sensors are possible as well.

Cloud-Based Servers

Figure 7B:
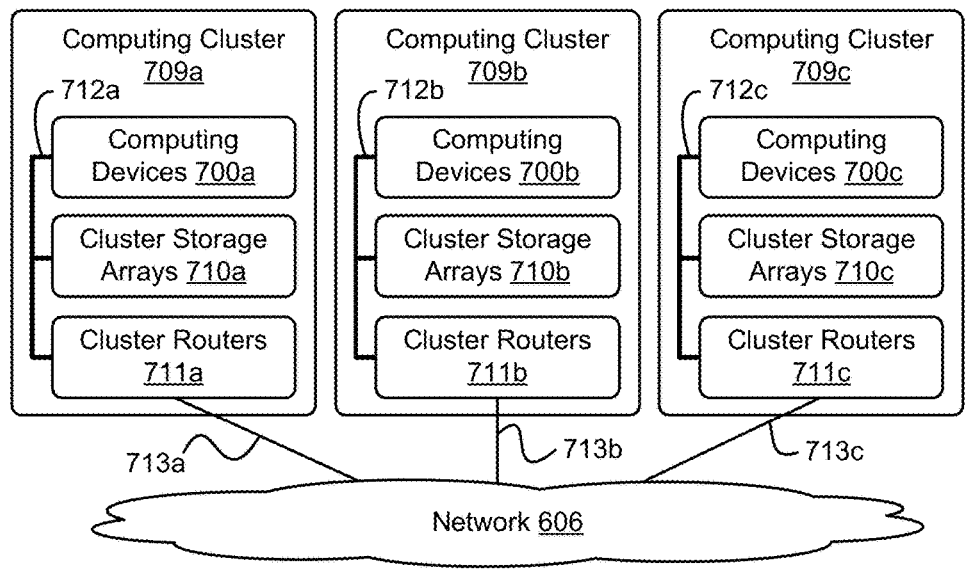
FIG. 7B depicts a cloud-based server system, in accordance with an example embodiment.

FIG. 7B depicts network 606 of computing clusters 709a, 709b, 709c arranged as a cloud-based server system in accordance with an example embodiment. Server device 608 and/or cloud device 610 can be cloud-based devices that store program logic and/or data of cloud-based applications and/or services. Some or all of the modules/components of server device 608 and/or cloud device 610 can be cloud-based devices that store program logic and/or data of cloud-based applications and/or services. In some embodiments, server device 608 and/or cloud device 610 can be on a single computing device residing in a single computing center. In other embodiments, server device 608 and/or cloud device 610 can include multiple computing devices in a single computing center, or even multiple computing devices located in multiple computing centers located in diverse geographic locations. For example, FIG. 7 depicts each of server device 608 and cloud device 610 residing in different physical locations.

In some embodiments, software and data associated with server device 608 and/or cloud device 610 can be encoded as computer readable information stored in non-transitory, tangible computer readable media (or computer readable storage media) and accessible by one or more of programmable devices 604a-604f and/or other computing devices. In some embodiments, data associated with server device 608 and/or cloud device 610 can be stored on a single disk drive, flash drive, or other tangible storage media, or can be implemented on multiple disk drives, flash drives, or other tangible storage media located at one or more diverse geographic locations.

FIG. 7B depicts a cloud-based server system in accordance with an example embodiment. In FIG. 7B, the functions of server device 608 and/or cloud device 610 can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of server device 608 and/or cloud device 610. In one embodiment, the various functionalities of server device 608 and/or cloud device 610 can be distributed among one or more of computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with server device 608 and/or cloud device 610 can be distributed across computing devices 700a, 700b, and 700c based at least in part on the storage and/or processing requirements of some or all components/modules of server device 608 and/or cloud device 610, the storage and/or processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server device 608 and/or cloud device 610 can be distributed across computing devices 700a, 700b, and 700c of computing clusters 709a, 709b, and 709c, various active portions and/or backup portions of data for these components can be distributed across cluster storage arrays 710a, 710b, and 710c. For example, some cluster storage arrays can be configured to store the data of one or more modules/components of server device 608 and/or cloud device 610, while other cluster storage arrays can store data of other modules/components of server device 608 and/or cloud device 610. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

Example Methods of Operation

Figure 8:
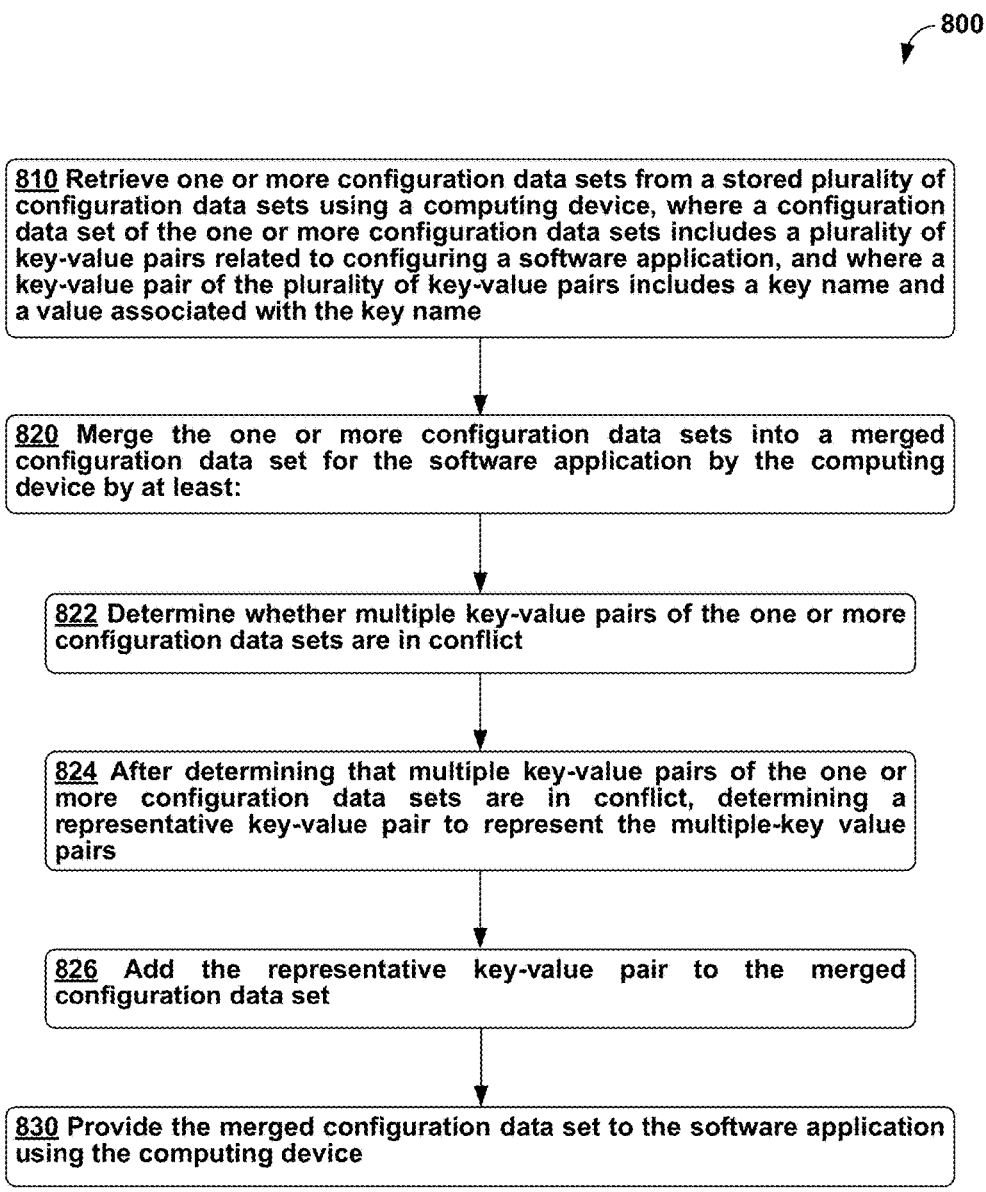
FIG. 8 is a flowchart illustrating a method, in accordance with an example embodiment.

FIG. 8 is a flowchart illustrating method 800, in accordance with an embodiment. Method 800 can be carried out by a computing device, such as, but not limited to, one or more computing devices 700.

Method 800 can begin at block 810. At block 810, the computing device can retrieve one or more configuration data sets from a stored plurality of configuration data sets, such as discussed above regarding at least FIGS. 2A-3C. A configuration data set of the one or more configuration data sets can include a plurality of key-value pairs related to configuring a software application, where a key-value pair of the plurality of key-value pairs includes a key name and a value associated with the key name, such as discussed above regarding at least FIGS. 1-5F. In some embodiments, the value associated with the key name is at least one of: a single value, a set of two or more values, a set of one or more key-value pairs, and a designated value representing an unused value, such as discussed above regarding at least FIG. 1.

At block 820, the computing device can merge the one or more configuration data sets into a merged configuration data set for the software application by at least carrying out the procedures of blocks 822, 824, and 826, such as discussed above regarding at least FIGS. 2A-5F.

At block 822, the computing device can determine whether multiple key-value pairs of the one or more configuration data sets are in conflict, such as discussed above regarding at least FIGS. 5A-5F.

In some embodiments, determining whether multiple key-value pairs of the one or more configuration data sets are in conflict can include determining whether multiple key-value pairs of the one or more configuration data sets share a common key name, such as discussed above regarding at least FIGS. 5A-5F. In particular of these embodiments, the multiple key-value pairs of the one or more configuration data sets can share the common key name. Then, determining a representative key-value pair to represent the multiple key-value pairs can include: combining the values of the multiple key-value pairs that share the common key name into a combined value, determining that a key name of the representative key-value pair to the common key name, and determining that a value of the representative key-value pair includes the combined value, such as discussed above regarding at least FIGS. 5A-5F.

In other embodiments, the one or more configuration data sets are associated with metadata, such discussed above regarding at least FIGS. 1 and 5A-5C. Then, determining the representative key-value pair to represent the multiple key-value pairs can include determining the representative key-value pair based on the metadata, such as discussed above regarding at least FIGS. 5A-5C.

In particular of these embodiments, determining the representative key-value pair to represent the multiple key-value pairs based on the one or more priorities can include: determining one or more priorities based on the metadata; determining a highest priority key-value pair of the multiple key-value pairs based on the one or more priorities; and selecting the highest priority key-value pair as the representative key-value pair, such as discussed above regarding at least FIGS. 5A and 5B.

At block 824, the computing device can, after determining that multiple key-value pairs of the one or more configuration data sets are in conflict, determine a representative key-value pair to represent the multiple key-value pairs, such as discussed above regarding at least FIGS. 5A-5F. In some embodiments, determining the representative key-value pair to represent the multiple key-value pairs comprises determining a null key-value pair to represent the multiple key-value pairs, such as discussed above regarding at least FIG. 5B. In other embodiments, determining the representative key-value pair to represent the multiple key-value pairs comprises determining a null key-value pair to represent the multiple key-value pairs based on one or more conflict resolution rules, such as discussed above regarding at least FIG. 4B.

At block 826, the computing device can add the representative key-value pair to the merged configuration data set, such as discussed above regarding at least FIGS. 5A-5F.

At block 830, the computing device can provide the merged configuration data set to the software application, such as discussed above regarding at least FIGS. 2A-2C and 5A-5F.

In some embodiments, method 800 can include: receiving the plurality of configuration data sets from a plurality of sources; and storing the plurality of configuration data sets using the computing device, such as discussed above regarding at least FIGS. 2A-3C. In particular of these embodiments, a first source of the plurality of sources can be the computing device and a second source of the plurality of sources can be a second computing device that differs from the computing device, such as discussed above regarding at least FIGS. 2A-3C.

In other embodiments, a particular configuration data set of the one or more configuration data sets includes a rule for determining a key-value pair, such as discussed above regarding at least FIGS. 2A-4B. Then, in these embodiments, method 800 can further include: determining a context for the one or more configuration data sets; and determining a particular key-value pair by resolving the rule of the particular configuration data set based on the context, such as discussed above regarding at least FIGS. 4A and 4B.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flowcharts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flowcharts discussed herein, and these ladder diagrams, scenarios, and flowcharts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or nonvolatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   retrieving one or more configuration data sets and a template configuration data set from a stored plurality of configuration data sets using a computing device, wherein each configuration data set of the one or more configuration data sets and the template configuration data set comprises a plurality of key-value pairs related to configuring a software application, wherein the template configuration data set comprises a template rule for determining a particular key-value pair, and wherein a key-value pair of the plurality of key-value pairs comprises a key name and a value associated with the key name;
   determining a context for the template configuration data set using the computing device, the context comprising a context key-value pair, the context key-value pair including a context key name and a context value associated with the context key name;
   generating a concrete configuration data set based on the template configuration data set by resolving the template rule of the template configuration data set by using the context value of the context key-value pair to determine the particular key-value pair for the concrete configuration data set using the computing device, wherein the particular key-value pair includes a particular key name that differs from the context key name of the context key-value pair, and wherein the template rule is not present in the concrete configuration data set;
   merging the one or more configuration data sets and the concrete configuration data set into a merged configuration data set for the software application by the computing device by at least:
      determining whether multiple key-value pairs of the one or more configuration data sets and the concrete configuration data set are in conflict,
      after determining that multiple key-value pairs of the one or more configuration data sets and the concrete configuration data set are in conflict, determining a representative key-value pair to represent the multiple key-value pairs, and
      adding the representative key-value pair to the merged configuration data set;
   providing the merged configuration data set to the software application using the computing device; and
   executing the software application on the computing device using the merged configuration data set to control application behavior.

2. The method of claim 1, wherein determining whether multiple key-value pairs of the one or more configuration data sets and the concrete configuration data set are in conflict comprises determining whether multiple key-value pairs of the one or more configuration data sets share a common key name.

3. The method of claim 2, wherein the multiple key-value pairs of the one or more configuration data sets and the concrete configuration data set share the common key name, and wherein determining a representative key-value pair to represent the multiple key-value pairs comprises:
   combining the values of the multiple key-value pairs that share the common key name into a combined value;
   determining that a key name of the representative key-value pair to the common key name; and
   determining that a value of the representative key-value pair comprises the combined value.

4. The method of claim 1, wherein the one or more configuration data sets and the concrete configuration data set are associated with metadata, and wherein determining the representative key-value pair to represent the multiple key-value pairs comprises determining the representative key-value pair based on the metadata.

5. The method of claim 4, wherein determining the representative key-value pair to represent the multiple key-value pairs based on the metadata comprises:
   determining one or more priorities based on the metadata;
   determining a highest priority key-value pair of the multiple key-value pairs based on the one or more priorities; and
   selecting the highest priority key-value pair as the representative key-value pair.

6. The method of claim 1, further comprising:
   receiving the plurality of configuration data sets from a plurality of sources; and
   storing the plurality of configuration data sets using the computing device.

7. The method of claim 6, wherein a first source of the plurality of sources is the computing device, and where a second source of the plurality of sources is a second computing device that differs from the computing device.

8. The method of claim 1, wherein determining the representative key-value pair comprises determining the representative key-value pair based on one or more merge rules assigning priorities to the one or more configuration data sets and the concrete configuration data set.

9. The method of claim 1, wherein the value associated with the key name is at least one of: a single value, a set of two or more values, a set of one or more key-value pairs, and a designated value representing an unused value.

10. The method of claim 1, wherein determining the representative key-value pair to represent the multiple key-value pairs comprises determining a null key-value pair to represent the multiple key-value pairs.

11. The method of claim 1, wherein resolving the template rule of the template configuration data set by using the context value of the context key-value pair comprises resolving the template rule of the template configuration data set by using: an application-specific value of the context key-value pair about the software application, a device-specific value of the context key-value pair about the computing device, a location-specific value of the context key-value pair about a location where the application is being executed, or a combination thereof.

12. A computing device, comprising:
   one or more processors; and
   a data storage device having at least instructions stored thereon that, upon execution of the instructions by the one or more processors, cause the one or more processors to perform functions comprising:
      retrieving one or more configuration data sets and a template configuration data set from a stored plurality of configuration data sets, wherein each configuration data set of the one or more configuration data sets and the template configuration data set comprises a plurality of key-value pairs related to configuring a software application, wherein the template configuration data set comprises a template rule for determining a particular key-value pair, and wherein a key-value pair of the plurality of key-value pairs comprises a key name and a value associated with the key name;

determining a context for the template configuration data set, the context comprising a context key-value pair, the context key-value pair including a context key name and a context value associated with the context key name;

generating a concrete configuration data set based on the template configuration data set by resolving the template rule of the template configuration data set by using the context value of the context key-value pair to determine the particular key-value pair for the concrete configuration data set, wherein the particular key-value pair includes a particular key name that differs from the context key name of the context key-value pair, and wherein the template rule is not present in the concrete configuration data set;

merging the one or more configuration data sets and the concrete configuration data set into a merged configuration data set for the software application by at least:

determining whether multiple key-value pairs of the one or more configuration data sets and the concrete configuration data set are in conflict, after determining that multiple key-value pairs of the one or more configuration data sets and the concrete configuration data set are in conflict, determining a representative key-value pair to represent the multiple key-value pairs, and adding the representative key-value pair to the merged configuration data set;

providing the merged configuration data set to the software application, and executing the software application using the merged configuration data set to control application behavior.

13. The computing device of claim 12, wherein determining whether multiple key-value pairs of the one or more configuration data sets and the concrete configuration data set are in conflict comprises determining whether multiple key-value pairs of the one or more configuration data sets share a common key name.

14. The computing device of claim 13, wherein the multiple key-value pairs of the one or more configuration data sets and the concrete configuration data set share the common key name, and wherein determining a representative key-value pair to represent the multiple key-value pairs comprises:

combining the values of the multiple key-value pairs that share the common key name into a combined value;

determining that the key name of the representative key-value pair comprises the common key name; and determining that the value of the representative key-value pair comprises the combined value.

15. The computing device of claim 12, wherein the one or more configuration data sets and the concrete configuration data set are associated with metadata, and wherein determining the representative key-value pair to represent the multiple key-value pairs comprises determining the representative key-value pair based on the metadata.

16. The computing device of claim 15, wherein determining the representative key-value pair to represent the multiple key-value pairs based on the metadata comprises:

determining one or more priorities based on the metadata;

determining a highest priority key-value pair of the multiple key-value pairs based on the one or more priorities; and selecting the highest priority key-value pair as the representative key-value pair.

17. The computing device of claim 12, wherein the functions further comprise:

receiving the plurality of configuration data sets from a plurality of sources; and storing the plurality of configuration data sets.

18. The computing device of claim 17, wherein a first source of the plurality of sources is the computing device, and where a second source of the plurality of sources is a second computing device that differs from the computing device.

19. The computing device of claim 12, wherein determining the representative key-value pair comprises determining the representative key-value pair based on one or more merge rules assigning priorities to the one or more configuration data sets and the concrete configuration data set.

20. An article of manufacture including a data storage device having instructions stored thereon that, when executed by one or more processors, cause the one or more processors to perform functions comprising:

retrieving one or more configuration data sets and a template configuration data set from a stored plurality of configuration data sets, wherein each configuration data set of the one or more configuration data sets and the template configuration data set comprises a plurality of key-value pairs related to configuring a software application, wherein the template configuration data set comprises a template rule for determining a particular key-value pair, and wherein a key-value pair of the plurality of key-value pairs comprises a key name and a value associated with the key name;

determining a context for the template configuration data set, the context comprising a context key-value pair, the context key-value pair including a context key name and a context value associated with the context key name;

generating a concrete configuration data set based on the template configuration data set by resolving the template rule of the template configuration data set by using the context value of the context key-value pair to determine the particular key-value pair for the concrete configuration data set, wherein the particular key-value pair includes a particular key name that differs from the context key name of the context key-value pair, and wherein the template rule is not present in the concrete configuration data set;

merging the one or more configuration data sets and the concrete configuration data set into a merged configuration data set for the software application by at least:

determining whether multiple key-value pairs of the one or more configuration data sets and the concrete configuration data set are in conflict, after determining that multiple key-value pairs of the one or more configuration data sets and the concrete configuration data set are in conflict, determining a representative key-value pair to represent the multiple key-value pairs, adding the representative key-value pair to the merged configuration data set; and providing the merged configuration data set to the software application; and executing the software application using the merged configuration data set to control application behavior.

21. The article of manufacture of claim 20, wherein determining whether multiple key-value pairs of the one or more configuration data sets and the concrete configuration data set are in conflict comprises determining whether multiple key-value pairs of one or more configuration data sets share a common key name.

22. The article of manufacture of claim 20, wherein the one or more configuration data sets and the concrete configuration data set are associated with metadata, and wherein determining the representative key-value pair to represent the multiple key-value pairs comprises:
   determining one or more priorities based on the metadata;
   determining a highest priority key-value pair of the multiple key-value pairs based on the one or more priorities; and
   selecting the highest priority key-value pair as the representative key-value pair.

23. The article of manufacture of claim 20, wherein the functions further comprise:
   receiving the plurality of configuration data sets from a plurality of sources; and
   storing the plurality of configuration data sets.

24. The article of manufacture of claim 20, wherein determining the representative key-value pair comprises determining the representative key-value pair based on one or more merge rules assigning priorities to the one or more configuration data sets and the concrete configuration data set.

\* \* \* \* \*